US00RE50266E

(19) United States
(12) Reissued Patent
Graybill

(10) Patent Number: US RE50,266 E
(45) Date of Reissued Patent: Jan. 14, 2025

(54) COLLAPSIBLE CHAIR

(71) Applicant: CROW HILL LLC, Mount Pleasant, SC (US)

(72) Inventor: Robert Steven Graybill, Mount Pleasant, SC (US)

(73) Assignee: Crow Hill LLC, Mount Pleasant, SC (US)

(21) Appl. No.: 17/576,476

(22) Filed: Jan. 14, 2022

Related U.S. Patent Documents

Reissue of:
(64) Patent No.: 10,531,740
Issued: Jan. 14, 2020
Appl. No.: 16/368,391
Filed: Mar. 28, 2019

U.S. Applications:
(63) Continuation of application No. 15/888,994, filed on Feb. 5, 2018, now Pat. No. 10,285,503.
(Continued)

(51) Int. Cl.
*A47C 4/28* (2006.01)
*A47C 4/02* (2006.01)
*A47C 13/00* (2006.01)

(52) U.S. Cl.
CPC ..... *A47C 4/286* (2013.01); *A47C 4/02* (2013.01); *A47C 13/00* (2013.01)

(58) Field of Classification Search
CPC .. A45B 5/00; A47C 4/286; A47C 5/10; A45F 2004/026
See application file for complete search history.

(56) References Cited

U.S. PATENT DOCUMENTS 1,203,849 A * 11/1916 Jaquet ..... B61G 3/08 213/165
2,137,427 A 11/1938 Campbell
(Continued)

FOREIGN PATENT DOCUMENTS

CH 208503 A 2/1940
CH 362189 A 5/1962
(Continued)

OTHER PUBLICATIONS

U.S. Appl. No. 63/201,999, filed May 21. 2021, Robert Steven Graybill.
(Continued)

*Primary Examiner* — Sarah B McPartlin
(74) *Attorney, Agent, or Firm* — Thompson Patent Law Offices PC

(57) ABSTRACT

Apparatus and associated methods relate to a collapsible chair having a collapsible lateral support rod, a pair of front legs, a pair of front chair support rods, and a pair of mechanical junctions configured to couple with an associated pair of poles, such that the collapsible chair is adapted to collapse into an easy-to-carry volume. In an illustrative example, the mechanical junctions may be releasably and/or shock-cord-coupled to various support rods and/or legs. The mechanical junctions may include locking mechanisms to lock the associated poles into a fixed position relative to the mechanical junctions, for example. The collapsible chair may include gear loops for hanging of gear from the collapsible chair. In various embodiments, a collapsible chair may advantageously provide a full size, lightweight chair configured for compact storage in a stowage bag for high portability during outdoor hiking.

33 Claims, 23 Drawing Sheets

Related U.S. Application Data

(60) Provisional application No. 62/620,305, filed on Jan. 22, 2018, provisional application No. 62/535,709, filed on Jul. 21, 2017, provisional application No. 62/454,112, filed on Feb. 3, 2017.

(56) References Cited

U.S. PATENT DOCUMENTS

| | | | | | |
|---|---|---|---|---|---|
| 2,587,543 | A * | 2/1952 | Smith | A47C 4/286 248/431 |
| 2,690,792 | A * | 10/1954 | Moss | A47C 4/286 297/42 |
| 2,766,813 | A | 10/1956 | Kay | |
| 2,831,447 | A * | 4/1958 | Hanna | B63H 9/065 114/102.27 |
| 4,184,711 | A | 1/1980 | Wakimoto | |
| 4,258,951 | A | 3/1981 | Groom | |
| 4,547,015 | A | 10/1985 | Wakimoto | |
| 4,605,261 | A | 8/1986 | Lee | |
| 4,673,211 | A | 6/1987 | Hoffman | |
| 4,914,768 | A | 4/1990 | Howard | |
| 5,054,849 | A * | 10/1991 | Hoff | A47C 4/286 297/440.11 |
| 5,362,130 | A | 11/1994 | Hoffman | |
| 5,499,857 | A | 3/1996 | Lynch, Jr. | |
| 5,709,428 | A | 1/1998 | Hugghins | |
| 5,921,621 | A | 7/1999 | Cook et al. | |
| 5,927,798 | A | 7/1999 | Ahn | |
| 6,371,553 | B1 | 4/2002 | Tang | |
| 8,006,711 | B2 | 8/2011 | Pietrzak et al. | |
| 8,454,084 | B2 * | 6/2013 | Lah | A47C 4/286 297/16.2 |
| 8,894,139 | B1 | 11/2014 | Coffey | |
| 8,899,686 | B1 * | 12/2014 | Kim | A47C 4/286 297/16.1 X |
| 9,326,612 | B2 * | 5/2016 | Kim | A47C 4/28 |
| 9,351,578 | B2 * | 5/2016 | Homans | A47C 4/02 |
| 9,854,882 | B1 | 1/2018 | Peck | |
| 10,285,503 | B2 | 5/2019 | Graybill | |
| 10,531,740 | B2 | 1/2020 | Graybill | |
| 11,166,530 | B1 | 11/2021 | Wilson, Jr. | |
| 2003/0094836 | A1 | 5/2003 | Chen | |
| 2004/0066064 | A1 | 4/2004 | Neely et al. | |
| 2004/0140696 | A1 | 7/2004 | Grace | |
| 2007/0252416 | A1 | 11/2007 | Park et al. | |
| 2008/0169688 | A1 | 7/2008 | Funderburg | |
| 2009/0039685 | A1 | 2/2009 | Zernov | |
| 2009/0230736 | A1 | 9/2009 | Homans | |
| 2011/0181078 | A1 | 7/2011 | Kelly et al. | |
| 2011/0243647 | A1 | 10/2011 | Sohn | |
| 2012/0104805 | A1 | 5/2012 | Lah | A47C 4/02 297/16.1 |
| 2014/0375104 | A1 | 12/2014 | Kim | |
| 2015/0091335 | A1 | 4/2015 | Lee | |
| 2015/0313330 | A1 | 11/2015 | Stevens et al. | |
| 2015/0374131 | A1 | 12/2015 | Kim | |
| 2016/0113402 | A1 * | 4/2016 | Lee | A47C 4/42 297/16.2 |
| 2016/0113403 | A1 | 4/2016 | Lee | |
| 2017/0106266 | A1 * | 4/2017 | Nelson | A63B 69/002 |
| 2017/0311723 | A1 | 11/2017 | Lenhart | |
| 2018/0035806 | A1 | 2/2018 | Yang | |
| 2018/0070728 | A1 | 3/2018 | Humphreys et al. | |
| 2019/0104850 | A1 | 4/2019 | Frankel et al. | |
| 2021/0052076 | A1 | 2/2021 | Graybill | |
| 2021/0204696 | A1 | 7/2021 | Graybill | |
| 2022/0000268 | A1 | 1/2022 | Davis | |

FOREIGN PATENT DOCUMENTS

| | | | |
|---|---|---|---|
| CN | 2107161 | U | 6/1992 |
| CN | 200959890 | | 10/2007 |
| EP | 0209955 | A2 | 1/1987 |
| EP | 0997090 | A1 | 5/2000 |
| FR | 830436 | A | 7/1938 |
| GB | 694556 | A | 7/1953 |
| GB | 767316 | A | 1/1957 |
| GB | 2025213 | A | 1/1980 |
| WO | 2016055280 | A1 | 4/2016 |
| WO | 2016065981 | A1 | 5/2016 |
| WO | 2018145039 | A1 | 8/2018 |

OTHER PUBLICATIONS

Helinox, "Chair Two," Helinox [retrieved from the internet Jan. 12, 2022] <https://helinox.com/products/chair-two>.

Helinox, "Helinox Chair Two Ultralight, High-Back, Collapsible Camping Chair, Black," Amazon.com, Feb. 1, 2017, [retrieved from the internet Jan. 12, 2022] <https://www.amazon.com/Helinox-Chair-Camping-Black-Size/dp/B01MQVBU8Z/ref=sr_1_2?keywords=helinox+chair+two&qid=1642038450&sr=8-2>.

International Search Report and Written Opinion in Related PCT Application No. PCT/US18/16923, dated Apr. 24, 2018, 7 pages.

Mountainsmith, "Mountainsmith Sling Back Chair Anvil Grey," Amazon.com, Dec. 7, 2016 [retrieved from the internet Jan. 22, 2022] <https://www.amazon.com/gp/product/B01N7FXHSU/ref=as_li_tl?ie=UTF8&camp=1789&creative=9325&creativeASIN=B01N7FXHSU&linkCode=as2&tag=indoorsycampe-20&linkId=a0463672c146490ceaf793db81f635f4>.

Mulibex, Beach Demo—Transforming the Capra into the Seagot Islander, YouTube, Oct. 8, 2019, retrieved from the internet, <https://www.youtube.com/shorts/7U8yGt49_Lo>.

Mulibex, Capra | Freakishly Strong, Adaptive Light Chair System, Jul. 21, 2021, Kickstarter, retrieved from the Internet, < https://www.kickstarter.com/projects/mulibex/capra-freakishly-strong-adaptive-light-chair-system?ref=discovery&term=mulibex>.

Mulibex, Innovative Ultra Light Camp Chairs, Mar. 7, 2018, Kickstarter, retrieved from the internet, <https://www.kickstarter.com/projects/653830043/hybrid-light-camp-chairs-mulibex-made-in-america?ref=discovery&term=mulibex>.

Mulibex, Meet Capra A Freakishly Strong, Adaptive Light Chair System, Jun. 6, 2020, YouTube, retrieved from the internet, <https://youtu.be/812siscGBkU>.

Mulibex, Multi-Use Adaptable Light Gear, YouTube, Sep. 18, 2019, retrieved from the internet, <https://www.youtube.com/watch?v=x71xhPoyW14>.

Mulibex, There's Adventure and Healing in Nature, YouTube, Sep. 23, 2019, retrieved from the internet, <https://www.youtube.com/watch?v=_XRf_P1lt4&t=18s>.

Mulibex, Watch It Transform—Adaptive light Chair System, Mar. 30, 2020, YouTube, retrieved from the internet, <https://www.youtube.com/watch?v=Ka9zlQysnS8>.

International Preliminary Report on Patentability and Written Opinion of the International Searching Authority in related foreign Application No. PCT/US2018/016923, dated Aug. 15, 2019, 6 pages.

* cited by examiner

COLLAPSIBLE CHAIR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *re-issue application of U.S. application Ser. No. 16/368,391, titled "Collapsible Chair," filed Mar. 28, 2019 by Robert Steven Graybill, and issued as U.S. Pat. No. 10,531,740 on Jan. 14, 2020, which application is a continuation of U.S. Ser. No. 15/888,994, titled "Collapsible Chair," filed by Robert Steven Graybill on Feb. 5, 2018, and issued as U.S. Pat. No. 10,285,503 on May 14, 2019, which application* claims the benefit of U.S. Provisional Application Ser. No. 62/620,305, titled "Muhl and Capra Chairs," filed by Robert Steven Graybill on Jan. 22, 2018[. This application also] and *which* claims the benefit of U.S. Provisional Application Ser. No. 62/535,709, titled "Collapsible Alpine Chair," filed by Robert Steven Graybill on Jul. 21, 2017[. This application also] *and which* claims the benefit of U.S. Provisional Application Ser. No. 62/454,112, titled "Portable Collapsible Trekking Pole Chair," filed by Robert Steven Graybill on Feb. 3, 2017[and is a continuation of U.S. Ser. No. 15/888,994 now filed on Feb. 5, 2018 now U.S. Pat. No. 10,285,503].

This application incorporates the entire contents of the foregoing application(s) herein by reference.

TECHNICAL FIELD

Various embodiments relate generally to chairs.

BACKGROUND

Chairs are pieces of furniture in which people may sit. A chair may include legs, a seat, and a back. The number of legs on a chair may be three, four, or more legs. A seat of a chair may be cushioned or non-cushioned. The back of a chair may be inclined or may form a 90-degree angle with respect to a horizontal chair seat.

There are different varieties of chairs. For example, a chair with arms may be referred to as an armchair. A chair with upholstery, reclining action, and a fold-out footrest may be referred to as a recliner. A permanently fixed chair in an airplane may be referred to as an airline seat. A chair used in an automobile may be referred to as a car seat. A chair with wheels may be referred to as a wheelchair.

SUMMARY

Apparatus and associated methods relate to a collapsible chair having a collapsible lateral support rod, a pair of front legs, a pair of front chair support rods, and a pair of mechanical junctions configured to couple with an associated pair of poles, such that the collapsible chair is adapted to collapse into an easy-to-carry volume. In an illustrative example, the mechanical junctions may be releasably and/or shock-cord-coupled to various support rods and/or legs. The mechanical junctions may include locking mechanisms to lock the associated poles into a fixed position relative to the mechanical junctions, for example. The collapsible chair may include gear loops for hanging of gear from the collapsible chair. In various embodiments, a collapsible chair may advantageously provide a full size, lightweight chair configured for compact storage in a stowage bag for high portability during outdoor hiking.

Various embodiments may achieve one or more advantages. For example, some embodiments may provide for a comfortable seating option when hiking in the wilderness. The collapsible chair may, for example, advantageously accommodate a tall and/or large person (e.g., taller than 6 ft.). The collapsible chair with a trapezoidal footprint may, in some examples, include added structural and stability for substantial tip-resistance. In some examples, the collapsible chair may be combined with poles (e.g., trekking, skiing), which may re-purposed to minimize the carrying weight of the chair for a hiking or skiing user. Deployment of the collapsible chair may, for example, be accomplished by shaking the chair in a collapsed state, which may facilitate self-assembly via various shock-cord-coupled components. The mechanical junctions may be flared to advantageously provide reinforced support and more resilient (e.g., fracture/crack resistant) ends of the mechanical junction.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
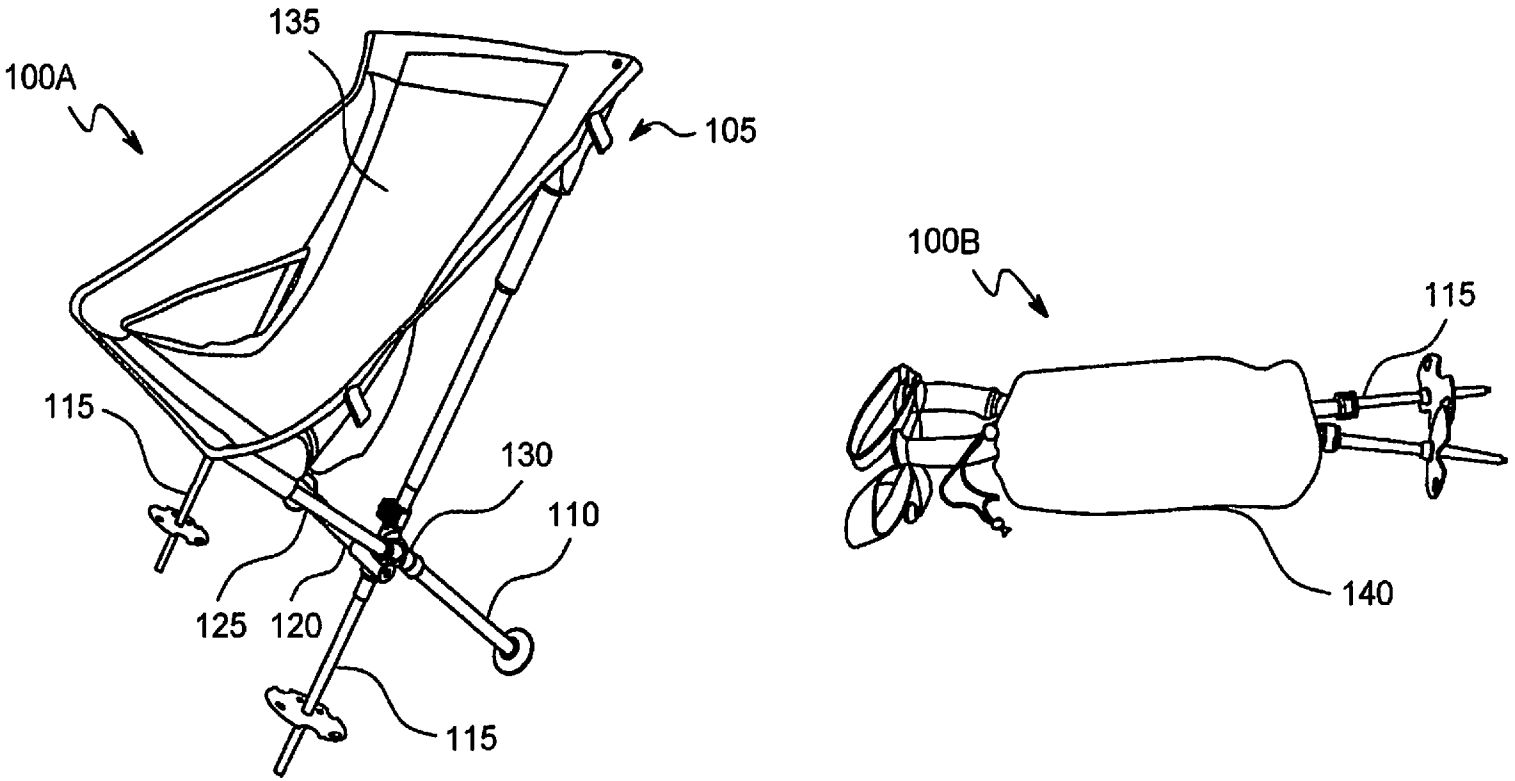
FIG. 1 depicts perspective views of an exemplary collapsible chair in a deployed state and a stowed state.

FIG. 1 depicts perspective views of an exemplary collapsible chair in a deployed state and a stowed state. A deployed state 100A includes a deployed collapsible chair 105. The deployed collapsible chair 105 includes a pair of back legs 110. The deployed collapsible chair 105 includes a pair of poles 115, which may act as a pair of front legs. The deployed collapsible chair 105 includes a collapsible lateral rod 120. In the present embodiment, the collapsible lateral rod 120 includes three releasably shock-cord-coupled rod pieces that allow the collapsible lateral rod 120 to be collapsed into a third of its assembled length. The collapsible chair 105 includes a pair of front chair support rods 125. The collapsible chair 105 includes a mechanical junction 130 on the sides of the collapsible chair 105. In some examples, the mechanical junction 130 may be: (1) shock-cord-coupled with an associated back leg 110 and front chair support rod 125, (2) fixedly coupled to the collapsible lateral rod 120, and (3) releasably coupled to an associated pole 115. In various embodiments, each mechanical junction 130 may be releasably coupled with an associated back leg 110, pole 115, and front chair support rod 125. In various embodiments, each mechanical junction 130 may be releasably coupled with the collapsible lateral rod 120. These components form a support structure for a flexible chair seat 135. The collapsible nature of the collapsible chair 105 may advantageously allow the collapsible chair 105 to collapse to a size small enough to fit inside a stowage bag.

A stowed state 100B includes a stowage bag 140 and a pair of poles 115. The stowage bag 140 stores the collapsible chair 105 (in a collapsed state) in a small and compact volume, which may advantageously allow high portability of the collapsible chair 105 during outdoor hiking and trekking, for example.

In the exemplary depiction of FIG. 1, the pair of poles 115 are trekking poles. In some embodiments, the pair of poles 115 may be a pair of ski poles. In some examples, the collapsible lateral rod 120 may be shock-cord-coupled (at the ends of the collapsible lateral rod 120) with the mechanical junctions 130. In various examples, the collapsible lateral rod 120 may be fixedly coupled with the mechanical junction 130 via a fastener (e.g., a blind rivet). In various embodiments, the collapsible lateral rod 120 may include a first section and second section releasably shock-cord-coupled to one another, such that the collapsible lateral rod 120 may be collapsed into half of its assembled length. The stowage bag 140 may, for example, store the poles 115 when the poles 115 are in a disassembled state.

Figure 2A:
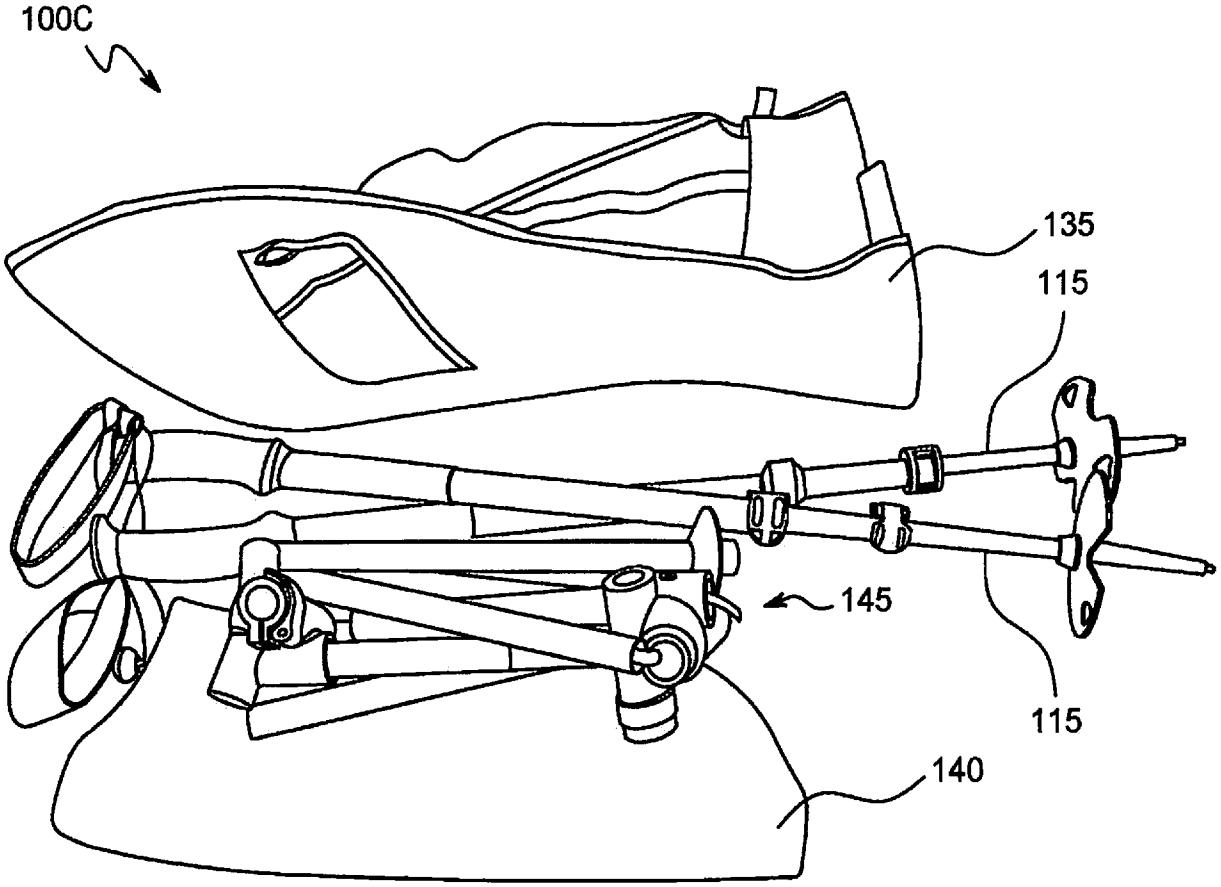
FIGS. 2A, 2B, 2C, 2D, 2E, 2F, and 2G depict various views of an exemplary collapsible chair illustrating the transition from a collapsed state to a deployed state.
Figure 2B:
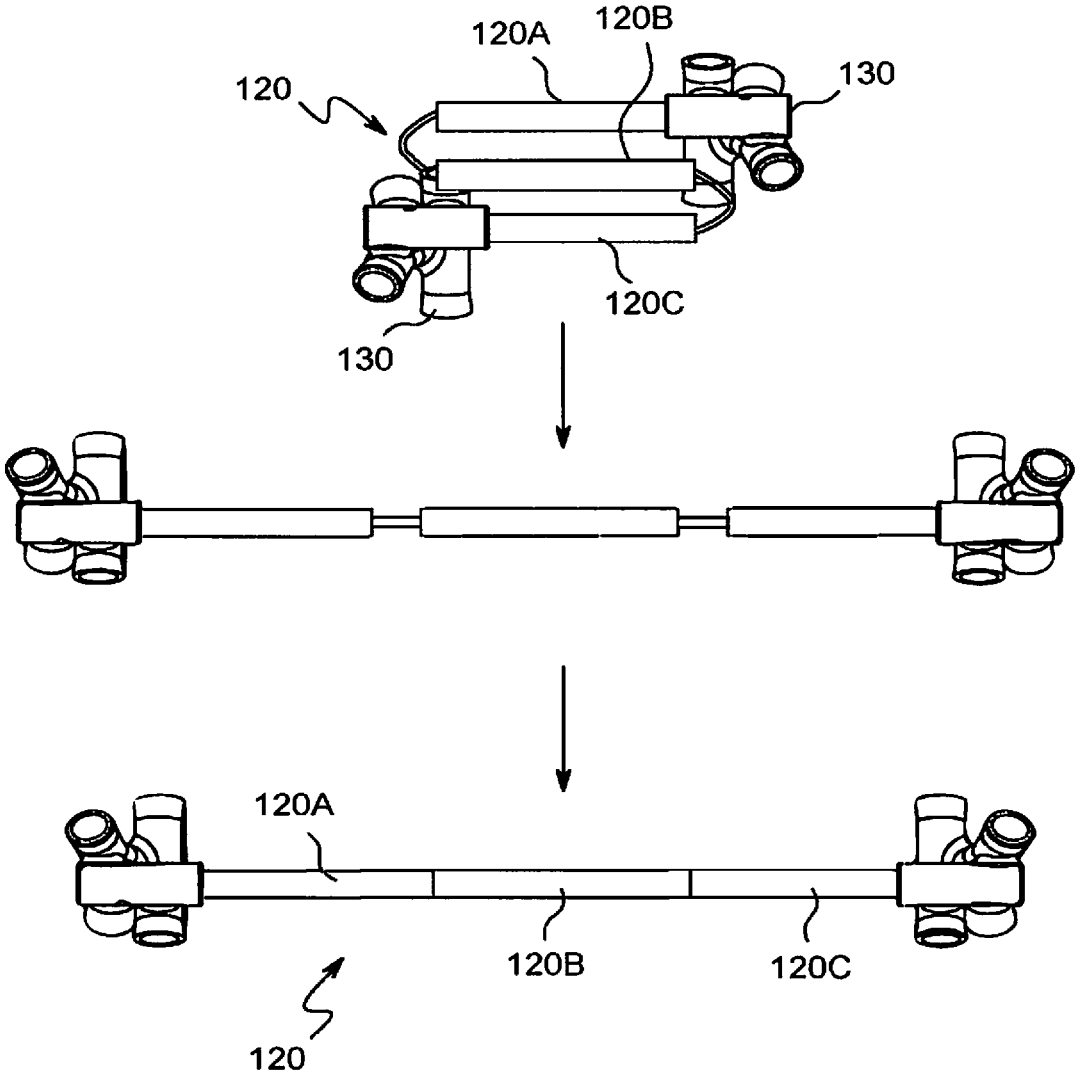

FIGS. 2A, 2B, 2C, 2D, 2E, 2F, and 2G depict various views of an exemplary collapsible chair illustrating the transition from a collapsed state to a deployed state. A collapsed state 100C (shown in FIG. 2A) includes the stowage bag 140, a pair of poles 115, a flexible chair seat 135, and a collapsed chair support structure 145. The collapsed chair support structure 145 includes the back legs 110, the collapsible lateral rod 120, the front chair support rods 125, and the mechanical junctions 130. The collapsed chair support structure 145 and flexible chair seat 135 may be stored in the stowage bag 140. FIG. 2B illustrates the assembly of the collapsible lateral rod 120 that is fixedly coupled to mechanical junctions 130 at the associated ends of the collapsible lateral rod 120. Moving from top to bottom of FIG. 2B, initially the collapsible lateral rod 120 is in a collapsed state. The collapsible lateral rod 120 includes a first section 120A shock-cord-coupled to a second section 120B, which is shock-cord-coupled to a third section 120C. Next, the three sections 120A-C are aligned along a common axis. Finally, the shock cords between the three sections 120A-C pull the sections together to form an assembled collapsible lateral rod 120.

Figure 2C:
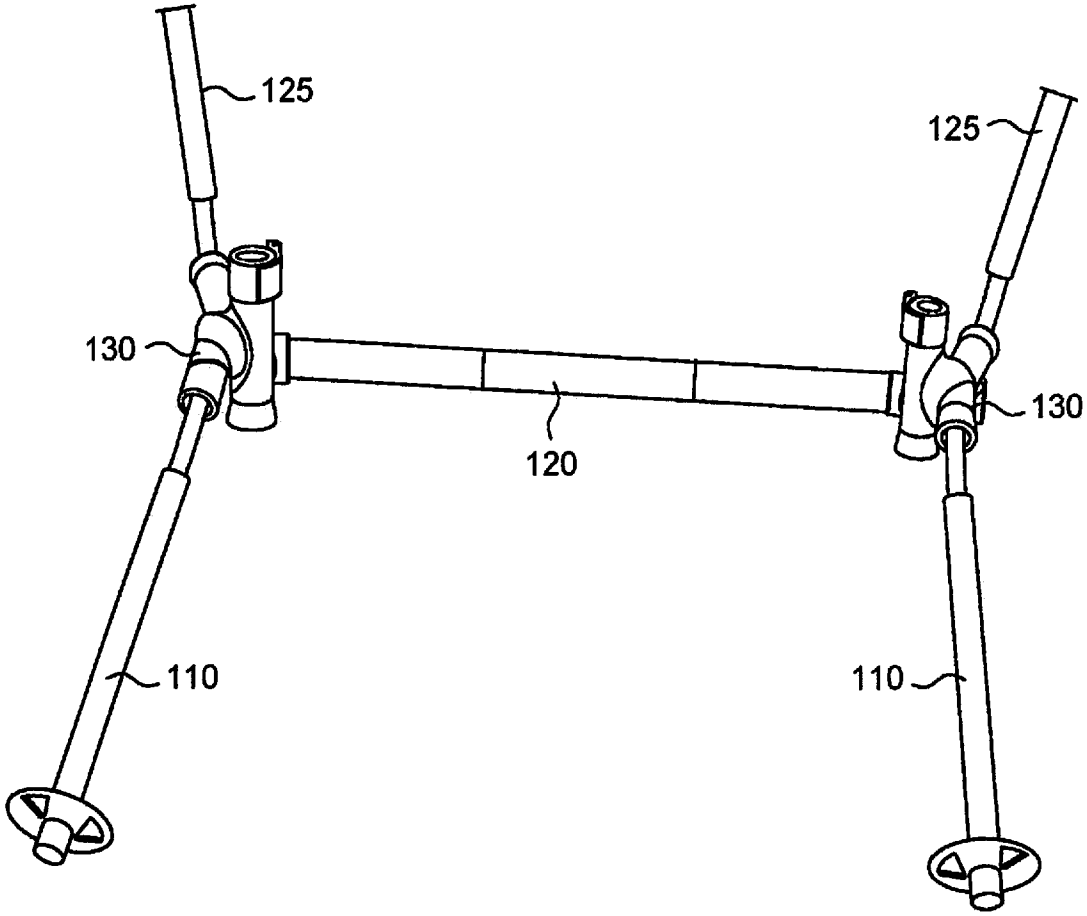

In FIG. 2C, the assembled collapsible lateral rod 120 is shown coupled to mechanical junctions 130. The mechanical junctions 130 are shock-cord-coupled to the associated back legs 110 and front chair support rods 125. In the depicted example, the back legs 110 and front chair support rods 125 are not yet assembled to the mechanical junctions 130.

Figure 2D:
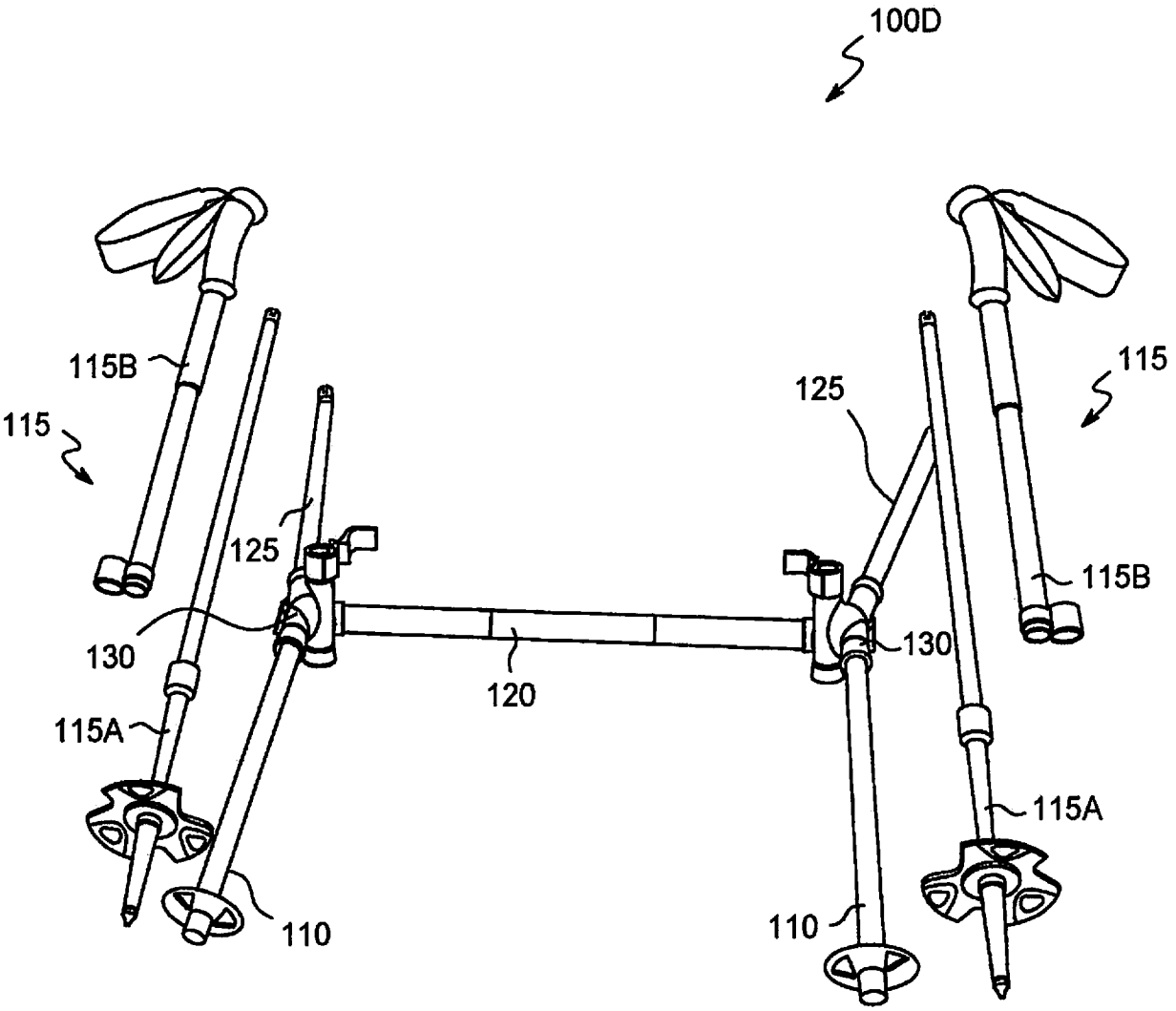

A user may manipulate the back legs 110 and front chair support rods 125 to transition the collapsible chair to a first intermediate deployed state 100D shown in FIG. 2D. In the first intermediate deployed state 100D, the back legs 110 and the front chair support rods 125 have been inserted into the mechanical junctions 130. The three sections of the collapsible lateral rod 120 assemble together to form a laterally extending rod. The first intermediate deployed state 100D may substantially resemble an "H" shape. The intermediate deployed state 100D depicts the poles 115 separated into a first pole section 115A and a second pole section 115B. In some examples, the first pole section 115A may correspond to a top section of the pole 115, and the second pole section 115B may correspond to a bottom section of the pole 115.

Figure 2E:
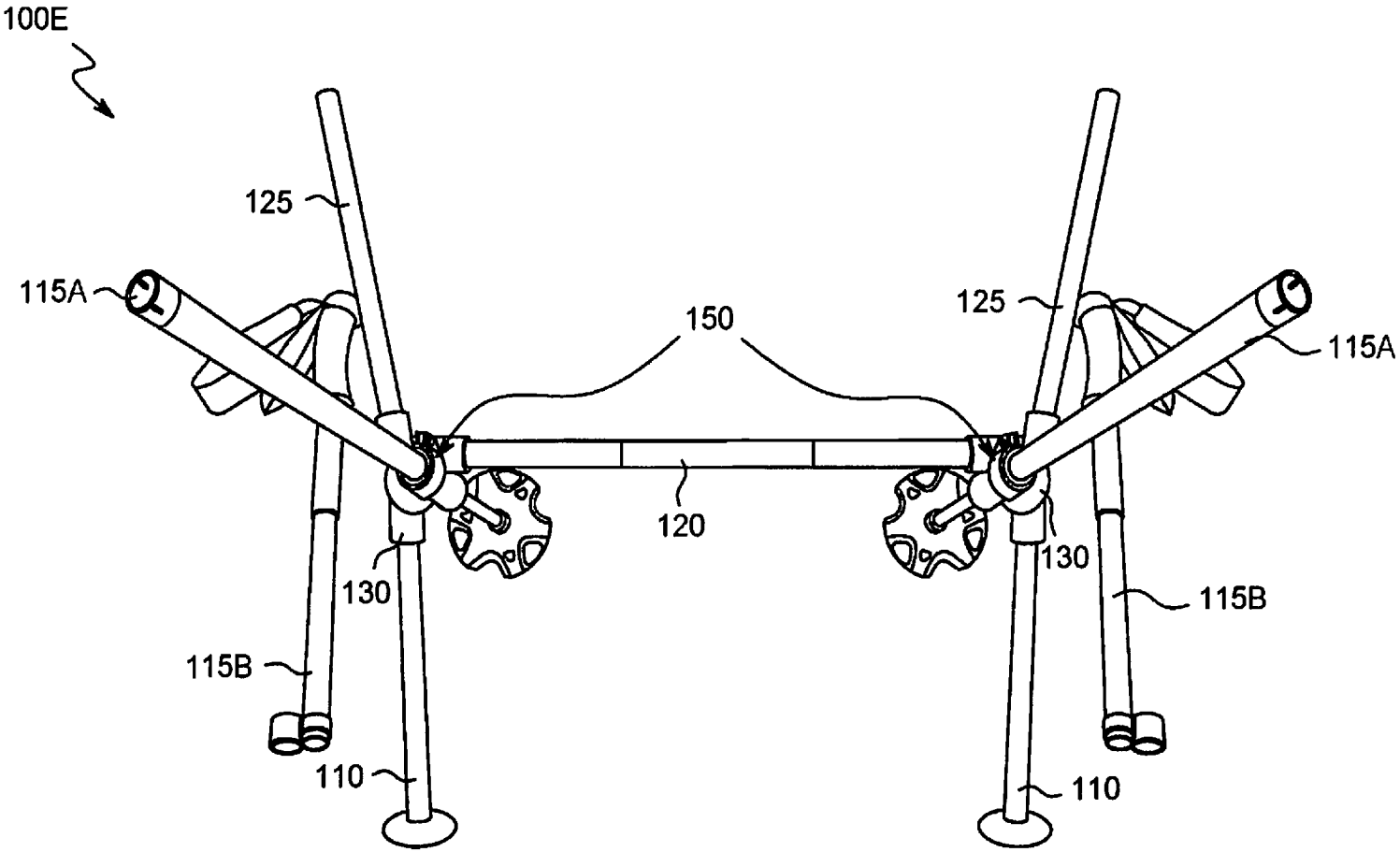

In FIG. 2E, both first pole sections 115A have been inserted into the associated mechanical junctions 130, transitioning the collapsible chair from the first intermediate deployed state 100D to a second intermediate deployed state 100E. The poles 115 may be selectively locked to the mechanical junctions 130 by selective locking members 150.

Figure 2F:
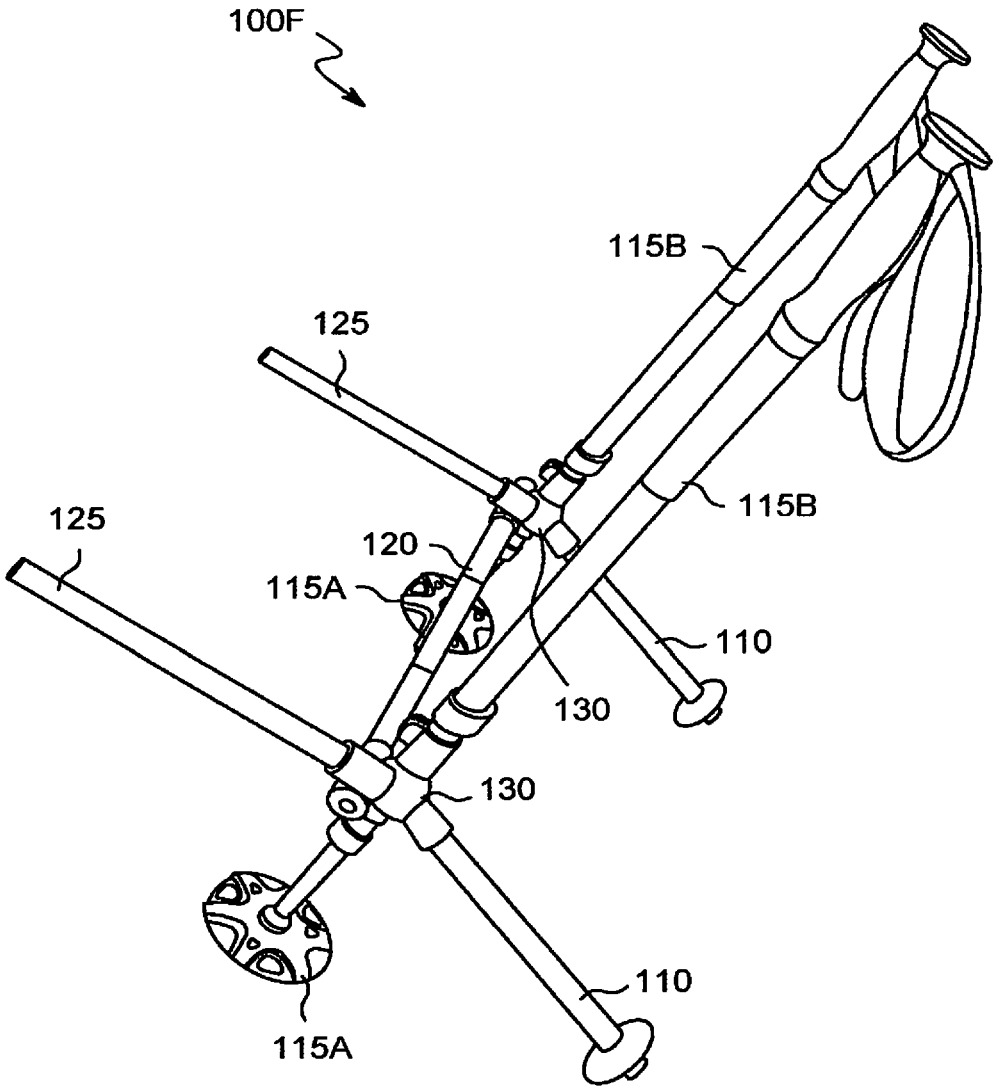
Figure 2G:
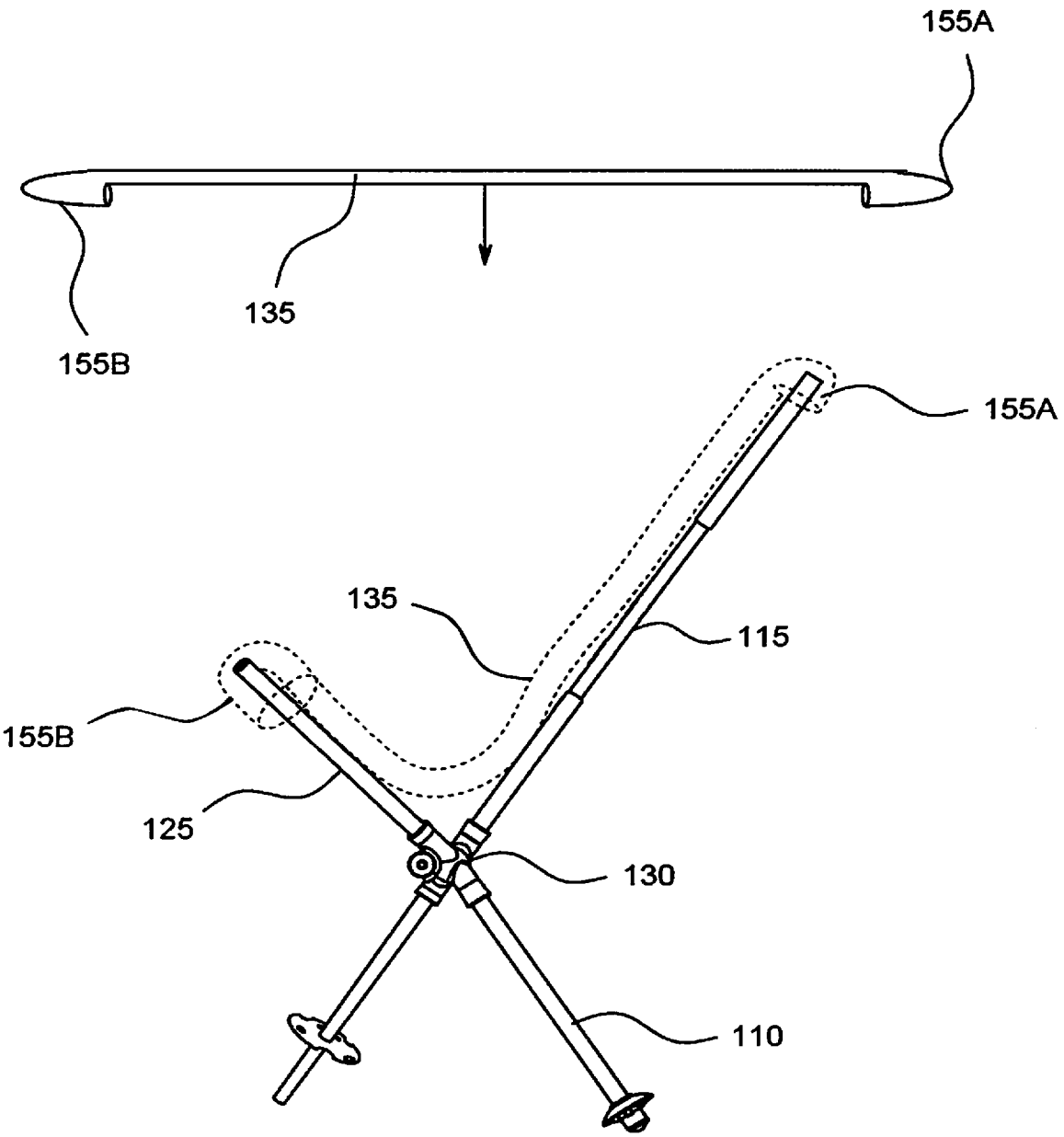

In FIG. 2F, the second pole sections 115B have been assembled with their associated first pole section 115A, creating an assembled support structure 100F for the collapsible chair. In FIG. 2G, a pair of top pockets 155A of the flexible chair seat 135 receive the distal ends of the poles 115, such that the poles 115 support the top of the flexible chair seat 135. The distal ends of the pair of front chair support rods 125 are inserted into an associated pair of front pockets 155B of the flexible chair seat 135, to transition the collapsible chair to a deployed state (e.g., FIG. 1, 100A).

Figure 3A:
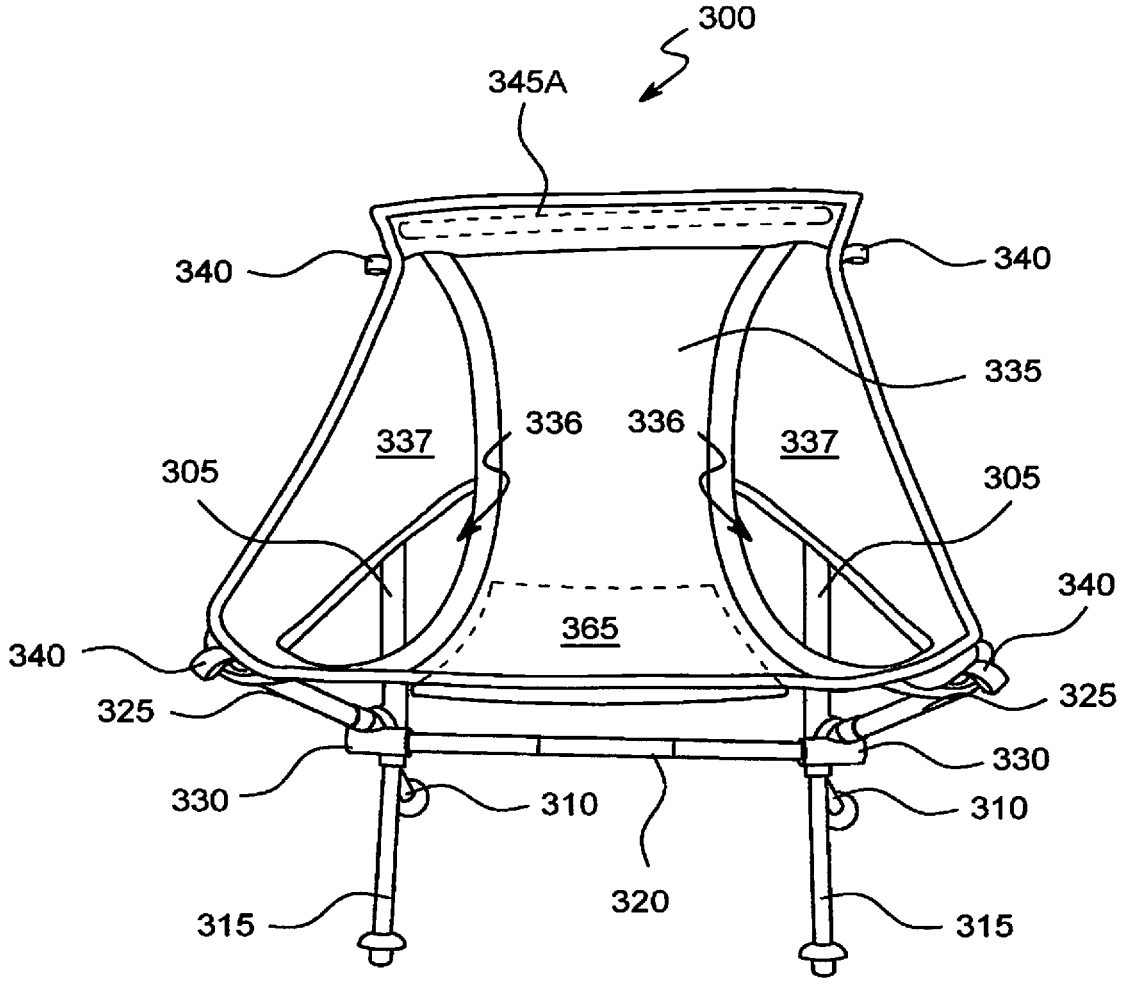
FIGS. 3A and 3B depict front and back views, respectively, of an exemplary collapsible chair having an exemplary "Capra-chair" construction.
Figure 3B:
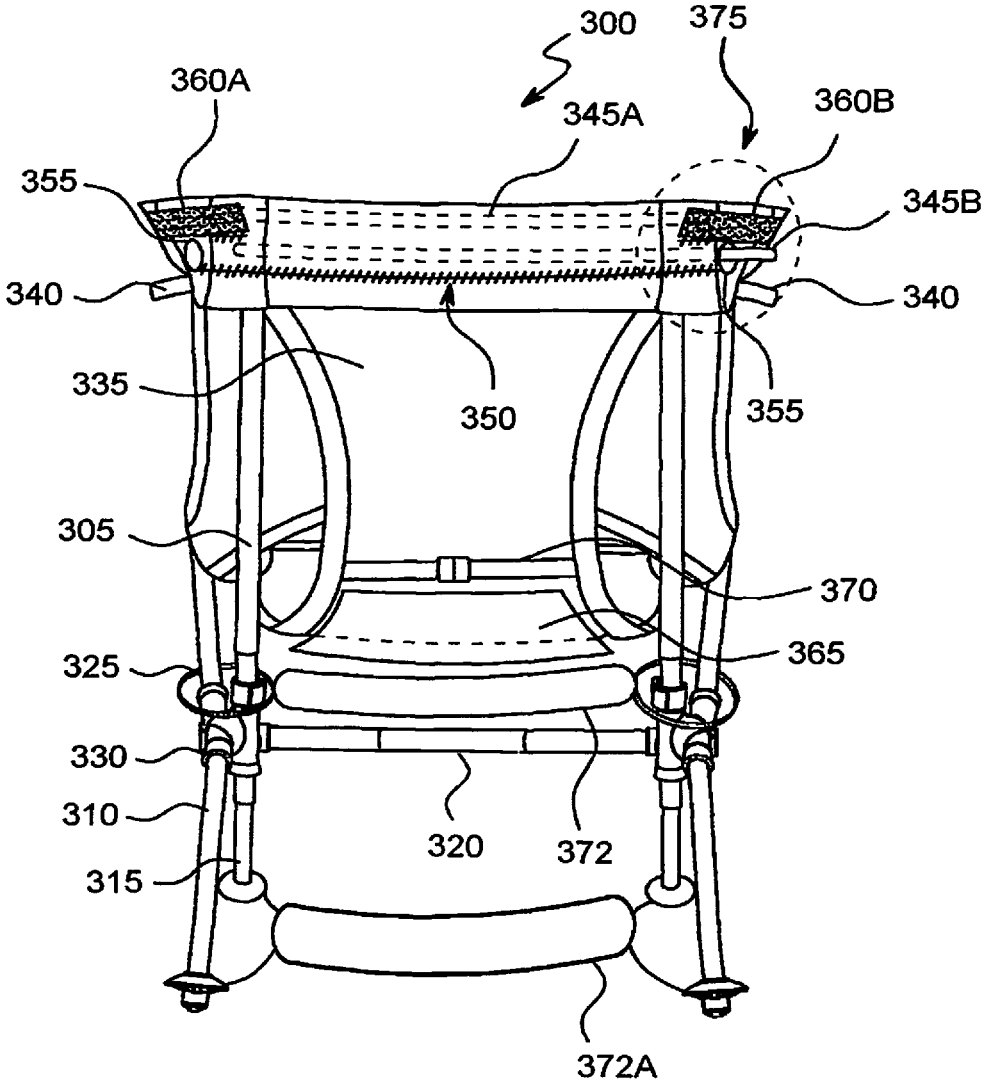

FIGS. 3A and 3B depict front and back views, respectively, of an exemplary collapsible chair having an exemplary "Capra-chair" construction. A deployed collapsible Capra-chair 300 includes a pair of back legs 310, a pair of front legs 315, a collapsible lateral rod 320, a pair of front chair support rods 325, a pair of back chair support rods 305, a pair of mechanical junctions 330, and a flexible chair seat 335. In some embodiments, each mechanical junction 330 may be (1) shock-cord-coupled with an associated back leg 310, front leg 315, front chair support rod 325, and back chair support rod 305, and (2) fixedly coupled to the collapsible lateral rod 320. In various embodiments, each mechanical junction 330 may be releasably coupled with an associated back leg 310, front leg 315, front chair support rod 325, and back chair support rod 305. In various embodiments, each mechanical junction 330 may be releasably coupled with the collapsible lateral rod 320.

In some examples, the front leg 315 and back chair support rod 305 may be a single rod extending through the mechanical junction 330. In various embodiments, the front leg 315 may be fixedly coupled to the mechanical junction 330. In some embodiments, the back chair support rod 305 may be fixedly coupled to the mechanical junction 330. In some examples, the back chair support rod 305 may be separated into a first section and a second section that are shock-cord-coupled to one another. In some embodiments, the front leg 315 and back chair support rod 305 may perform functions similar to the pole 115 in FIGS. 1 and 2A-G (e.g., function as the front leg(s) and back support for the collapsible chair, respectively).

In various examples, the flexible chair seat 335 may include side cutout areas 336 that may advantageously provide a sitting user with relief in their lower back, bottom, and upper leg areas (e.g., near the user's hips). The flexible chair seat 335 may include side panels 337 that interface with a back (e.g., back "saddle") of the flexible chair seat 335 to advantageously provide greater lumbar support for a sitting user. Furthermore, the placement of the side cutouts 335 may be optimized relative to a typical user's lumbar position. As an illustrative example, as force is applied to a bottom (e.g., bottom "saddle") of the flexible chair seat 335 (as a result of the user sitting in the collapsible chair 300), this force may pull in the side panels 337, such that the cutouts 336 may tightly conform around the midsection of the user, thus providing greater lumbar support for the user (e.g., without having to use the straps 370 discussed below). The cutouts 336 may, for example, reduce the overall weight of the flexible chair seat 335. The cutouts 336 may, in some embodiments, advantageously allow the seat 335 to conform to the user in multiple seating positions (e.g., stool or upright, sitting or reclined, and slouching), rather than forcing the user into the shape of the seat.

Located on the flexible chair seat 335 are gear loops 340. The gear loops 340 may, for example, be located on an outer periphery of the flexible chair seat 335. In this exemplary embodiment, a pair of gear loops 340 are located on the front side edges of the flexible chair seat 335, and another pair of gear loops 340 are located on the top side edges of the flexible chair seat 335. The gear loops 340 may advantageously allow hanging of gear (e.g., a water bottle) from the collapsible Capra-chair 300 (or Muhl-Chair 100).

Located on a top inner portion of the flexible chair seat 335 is a lateral stiffener rod 345A. The lateral stiffener rod 345A provides upper structural support to the flexible chair seat 335 when the collapsible chair 300 is in a deployed state (e.g., 100A, FIG. 1). The lateral stiffener rod 345A is resting in a top pocket 350 of the flexible chair seat 335. The top pocket 350 extends laterally across the top of the flexible chair seat 335. In the state indicated by reference number 345A, the lateral stiffener rod is retained in the top pocket 350. In the state indicated by reference number 345B, the lateral stiffener rod is entering/exiting the top pocket through a top corner aperture 355. Accordingly, the lateral stiffener rod 345A/345B may be selectively retained within the top pocket 350, such that the lateral stiffener rod, in state 345A, provides top structural support to the collapsible chair 300, and, in state 345B, may be removed from the top pocket 350 and portably stored within a stowage bag.

As shown in FIG. 3B, side straps 360A, 360B may be used to provide additional reinforcing support to the flexible chair seat 335 when the lateral stiffener rod 345A is retained in the top pocket 350. For example, the lateral stiffener rod 345A may create outward forces on the two top corners of the flexible chair seat 335 as it provides top lateral support to the flexible chair seat 335. Such forces may create significant wear on the top corners of the flexible chair seat 335. To mitigate this wear, side straps 360A, 360B may be stitched to the top side corners of the flexible chair seat 335, and then attached (e.g., via hook and loop fasteners) to the areas where the lateral stiffener rod 345A creates outward forces on the top corners of the flexible chair seat 335.

Located on a bottom side of the flexible chair seat 335 is an underquilt 365. The underquilt 365 may be releasably coupled (e.g., attached via, for example, clips or hook and loop fasteners) to the flexible chair seat 335. The underquilt 365 may advantageously provide bottom thermal insulation, operate to trap heat, and/or mitigate cold airflow for a user when the user is sitting in the collapsible chair 300.

In FIG. 3B, the collapsible chair 300 includes a back strap 370. The back strap 370 may be adjusted in length to add or relieve lateral tension to the back side of the flexible chair seat 335. For example, a small, short, and lightweight user may desire to shorten the length of the back strap 370 to adequately tailor the tension in the back of the flexible chair seat 335, while a tall and heavyweight user may desire to lengthen the length of the back strap 370 to adequately tailor the tension in the back of the flexible chair seat 335.

In FIG. 3B, the collapsible chair 300 includes a stowage bag 372. The stowage bag 372 may perform the dual functions of (1) stowing the various components of the collapsible chair 300 in a collapsed state (e.g., 100C, FIG. 2A), and (2) provide bottom support for the collapsible chair 300 in a deployed state (e.g., 100A, FIG. 1). For example, the stowage bag 372 may releasably couple (e.g., via tie strings) to the mechanical junctions 330. When a user sits in the collapsible chair 300, they may press down on the stowage bag 372, increasing the tension in the stowage bag 372. Accordingly, the stowage bag 372 may provide additional bottom support for the collapsible chair 300. Alternatively, the stowage bag 372A may be used as a support under the feet as a footprint for snow. For example, the stowage bag may be turned inside out and attached to the feet 310, 315 adjacent to the ground/snow to advantageously act as a snowshoe (e.g., a "footprint" or "ground sheet"). in deep snow. In various embodiments, the stowage bag may be clipped on to the any of the gear loops 340 for use as, for example, a pocket.

Figure 3C:
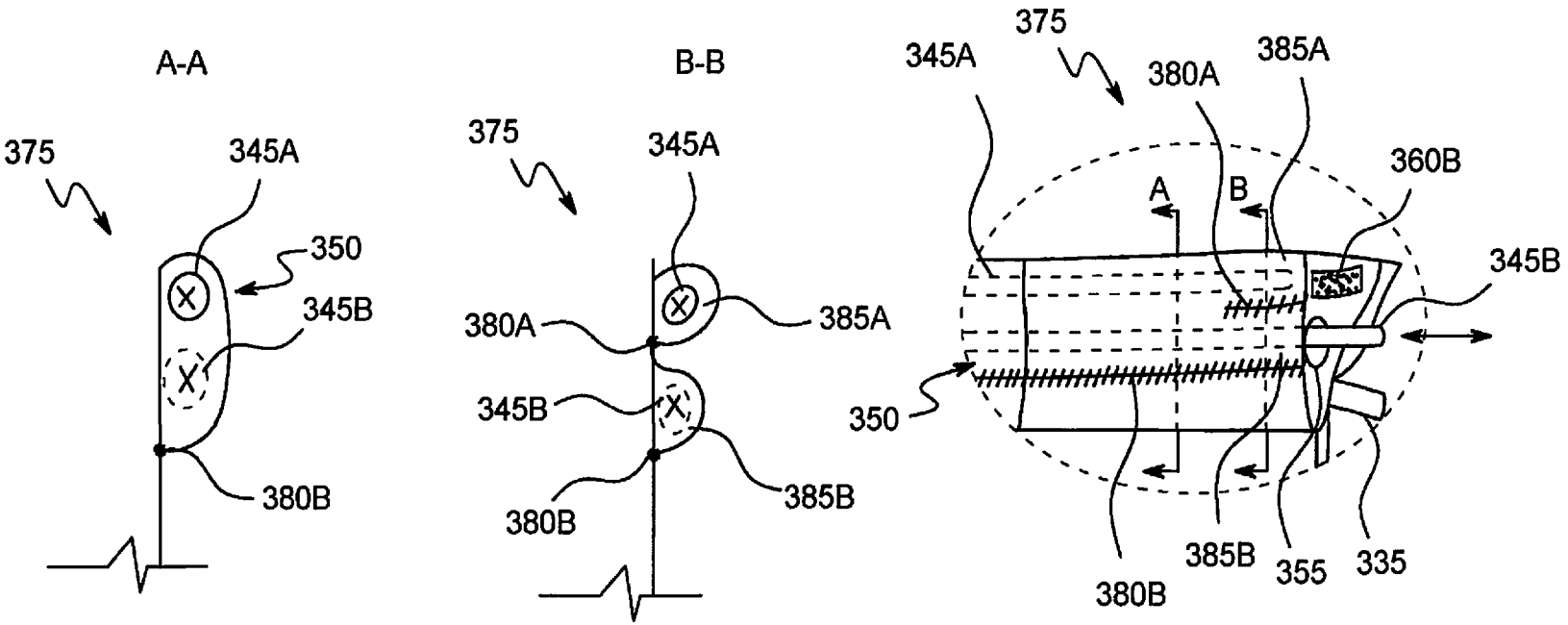
FIG. 3C depicts front and cross-sectional views for an exemplary top pocket and top lateral stiffener rod for providing structural support to the top of an exemplary collapsible chair.

FIG. 3C depicts front and cross-sectional views for an exemplary top pocket and top lateral stiffener rod for providing structural support to the top of an exemplary collapsible chair. A top right section 375 (also shown in FIG. 3B) of the collapsible chair 300 is shown in greater detail in FIG. 3C. In some examples, the top left section of the collapsible chair 300 is a mirror image of the top right section 375.

A top right section 375 includes a retained lateral stiffener rod 345A. The retained lateral stiffener rod 345A may transition to an entering/exiting lateral stiffener rod 345B. The lateral stiffener rod 345A, 345B is shown within the top lateral pocket 350 of the flexible chair seat 335. The top right section 375 includes a first stitching 380A and a second stitching 380B. The first and section stitchings 380A, 380B may define a top pocket section 385A and a bottom pocket section 385B of the top pocket 350. In some examples, the top pocket section 385A may be referred to as a "corner capture pocket." The first stitching 380A may extend along a limited top lateral distance of the top right section 375, while the second stitching 380B may extend along substantially the entire top lateral distance of the flexible chair seat 335. The retained lateral stiffener rod 345A may be retained within a top pocket section 385A of the top pocket 350 by the first stitching 380A. The bottom boundary of the top pocket 350 may be defined by the second stitching 380B. Two different cross-sectional views of the top right section 375 are also shown in FIG. 3C, and identified by the references A-A and B-B. The top right section 375 may further include side stitching to close off the sides of the top right section 375 (except for the top corner aperture 355).

In an exemplary illustration, a hiking user unpacks the collapsible chair 300 in a collapsed state (e.g., 100C, FIG. 2A) from the stowage bag. The user then assembles the collapsible chair 300 into a deployed state (e.g., 100A, FIG. 1) at a rest spot. After the flexible chair seat 335 has been coupled to the chair support structure (see, e.g., FIG. 2G), a user may take the lateral stiffener rod and insert it into the top corner aperture 355. The lateral stiffener rod 345B may then lie in the bottom pocket section 385B of the top pocket 350. A user may then push the lateral stiffener rod 345B up into the top pocket section 385A to capture the lateral stiffener rod in the top pocket section 385A, thus transitioning the lateral stiffener rod from state 345B to 345A (e.g., a "retained" state). In the retained state 345A, the lateral stiffener rod may be retaining in the top pocket 350 and provide top structural support for a user while they are sitting in the collapsible chair 300. When a user is ready to leave the rest spot and pack up the collapsible chair 300, the user removes the lateral stiffener rod from the top pocket section 385A and moves the lateral stiffener rod to the bottom pocket section 385B, thus transitioning the lateral stiffener rod from state 345A to 345B. The user then removes the lateral stiffener rod from the bottom pocket section 385B of the top pocket 350. Lastly, the user transitions the collapsible chair 300 to a collapsed state and stores the various components in a stowage bag, so the user can continue on their hike.

In various examples, the first and second stitchings 380A, 380B may instead be (heat-)bonded sections of the flexible chair seat 335. For example, lateral lengths of the top pocket 350 may be (partially) fused together to create top and bottom pocket sections 385A, 385B of the top pocket 350. In some embodiments, the first and second stitchings 380A, 380B may instead be adhesives, such that lateral lengths of the top pocket 350 may be (partially) glued together to create top and bottom pocket sections 385A, 385B of the top pocket 350.

In some examples, the lateral stiffener rod 345A, 345B may be collapsible. For example, the lateral stiffener rod may include a first and second section which are releasably and/or shock-cord-coupled to one another (e.g., similar to the lateral support rod 120). Accordingly, the lateral stiffener rod may collapse to a fraction of its maximum length, advantageously allowing it to be stored in the stowage bag along with the rest of the collapsible components of the collapsible chair 300.

Figure 4A:
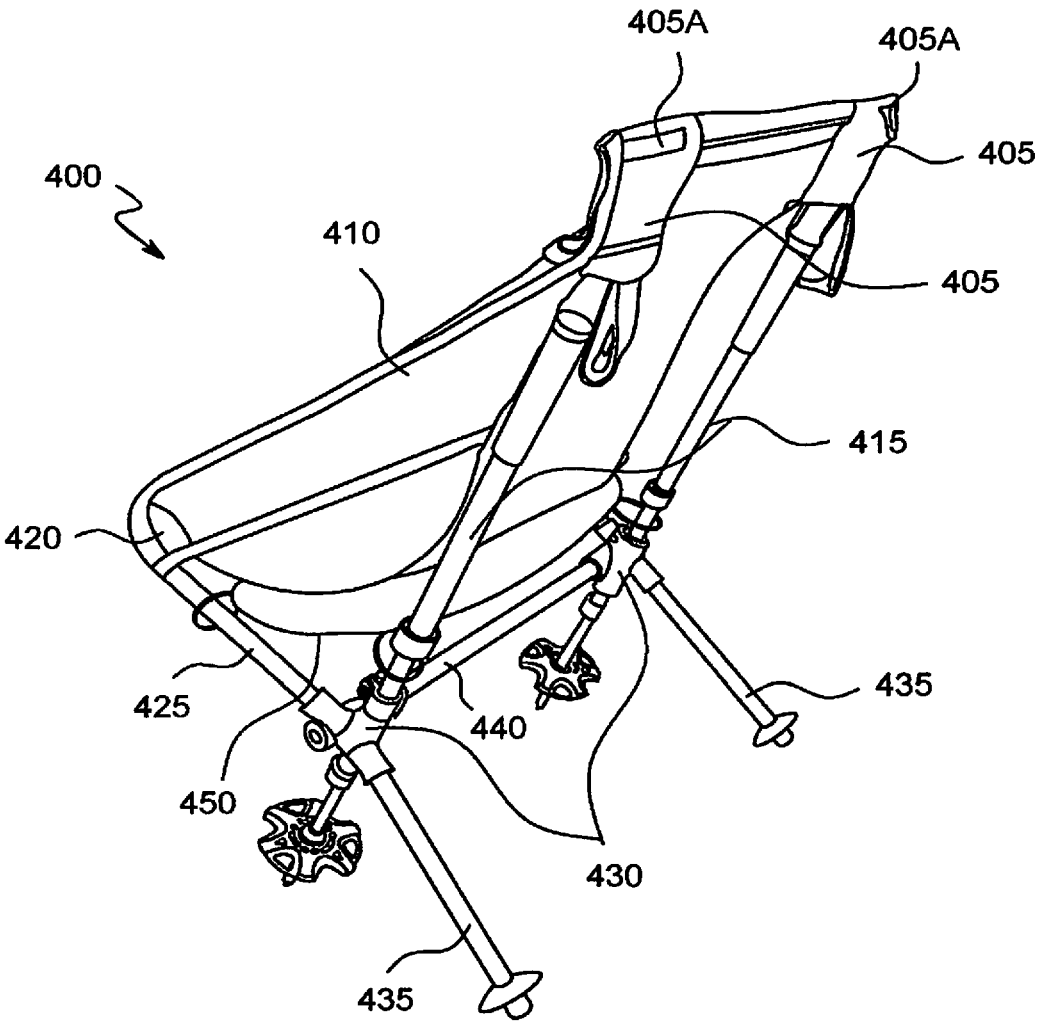
FIGS. 4A and 4B depict various views of an exemplary collapsible chair detailing exemplary pockets and exemplary mechanical junctions.
Figure 4B:
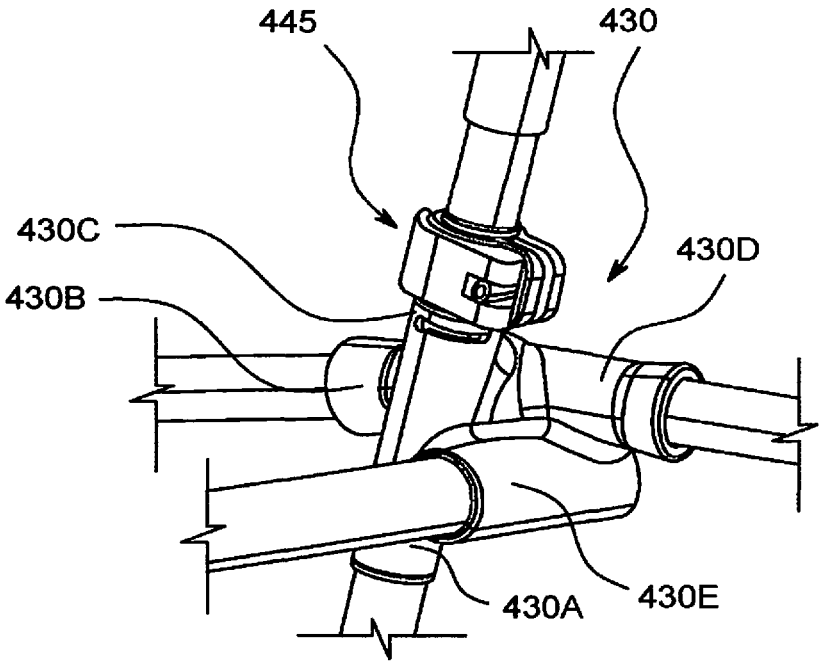

FIGS. 4A and 4B depict various views of an exemplary collapsible chair detailing exemplary pockets and exemplary mechanical junctions. A collapsible chair 400 includes top pockets 405 of a flexible chair seat 410. The top pockets 405 are configured to receive the distal ends of associated poles 415, such that the poles 415 supports the flexible chair seat 410 when the collapsible chair 400 is in a deployed state (e.g., FIG. 1, 100A). The front pockets 420 of the flexible chair seat 410 are configured to receive distal ends of associated front chair support rods 425, such that the front chair support rods 425 support the flexible chair seat 410 when the collapsible chair 400 is in a deployed state (e.g., FIG. 1, 100A). Hook and loop fastener straps 405A are located at the top pockets 405 and may provide increased durability and structural support for the top pocket 405.

The collapsible chair 400 includes a pair of mechanical junctions 430. As shown in the exemplary embodiment of FIG. 4B, each mechanical junction 430 has a front bottom end 430A, a back bottom end 430B, a back top end 430C, a front top end 430D, and a side end 430E. The front bottom end 430A and back top end 430C releasably couple (e.g., slidingly) with the pole 415. The back bottom end 430B couples with a back leg 435. The front top end 430D couples with a front chair support rod 425. A side end 430E couples, with a collapsible lateral rod 440. In this exemplary depiction, at least some of the ends of the mechanical junctions 430 are flared, which may advantageously provide reinforced support and more resilient (e.g., fracture/crack resistant) ends of the mechanical junction 430.

The mechanical junction 430 includes a locking mechanism 445 that locks the pole 415 into place relative to the mechanical junction 430. In this exemplary embodiment, the locking mechanism 445 is a collar clamp lock. The collar clamp lock 445 provides a clamping force to lockingly clamp the pole 415 to the mechanical junction 430. The locking mechanism 445 may be selectively locked/unlocked by a user to retain or remove the pole 415 from the mechanical junction 430. In some examples, the locking mechanism 445 may be a pin lock (e.g., cotter).

Also depicted in FIG. 4A is a stowage bag 450. The stowage bag 372 may perform the dual functions of (1) stowing the various components of the collapsible chair 400 in a collapsed state (e.g., 100C, FIG. 2A), and (2) provide bottom support for the collapsible chair 400 in a deployed state (e.g., 100A, FIG. 1). For example, the stowage bag 450 may releasably couple (e.g., via tie strings) to the poles 415 and the front chair support rods 425. When a user sits in the collapsible chair 400, they may press down on the stowage bag 450, increasing the tension in the stowage bag 450. Accordingly, the stowage bag 450 may provide additional bottom support for the collapsible chair 400.

Figure 5:
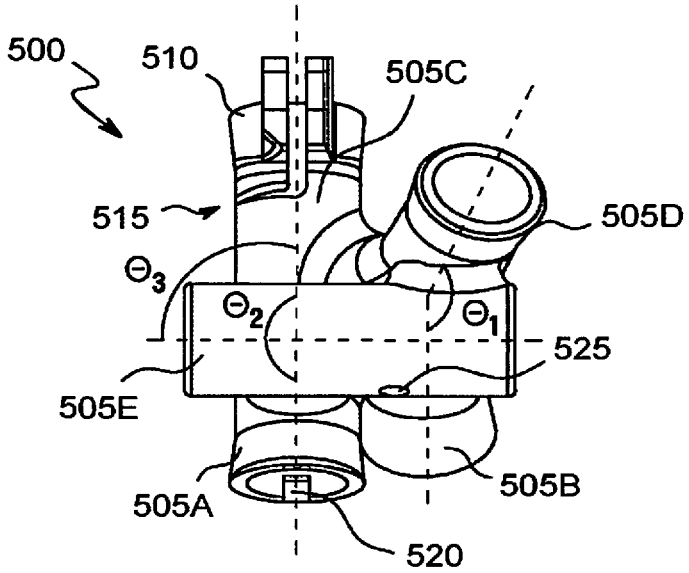
FIG. 5 depicts a front-side view of an exemplary mechanical junction with a locking mechanism.

FIG. 5 depicts a front-side view of an exemplary mechanical junction with a locking mechanism. The mechanical junction 500 may be, for example, the mechanical junction 130 shown in FIGS. 1 and 2A-G. The mechanical junction 500 has a front bottom end 505A, a back bottom end 505B, a back top end 505C, a front top end 505D, and a side end 505E.

The mechanical junction 500 includes a locking mechanism 510 that may selectively lock a rod or pole into place relative to the mechanical junction 500. In this exemplary embodiment, the locking mechanism 510 is a collar clamp lock. In some embodiments, the locking mechanism 510 may be a quick-release lock.

The mechanical junction 500 includes a radial slot 515 located proximate to the locking mechanism 510. The radial slot 515 may advantageously facilitate the locking compression of the locking mechanism 510 by allowing a portion of the back top end 505C to bend inward to frictionally engage a rod or pole. The radial slot 515 may help to reduce wear on the back top end 505C.

The mechanical junction 500 includes a hole 525 in the side end 505E. A fastener (e.g., blind rivet) may be inserted into the hole and through an associated hole in an end of the collapsible lateral rod (e.g., 120, FIG. 1). The fastener may fixedly couple an end of the collapsible lateral rod to the side end 505E of the mechanical junction.

The mechanical junction 500 may optionally include an internal sleeve extending through the front bottom end 505A and back top end 505C. The internal sleeve may, for example, be the internal sleeve located in the bottom left area of page 42 of the drawings of U.S. Provisional Application Ser. No. 62/620,305, titled "Muhl and Capra Chairs," filed by Robert Graybill, on Jan. 22, 2018, the entire contents of which are incorporated herein by reference. The internal sleeve may enclose a pole. When the locking mechanism 510 is tightened to a locked position, the internal sleeve may compressingly engage the pole to provide added (static) frictional force to retain a pole in a fixed position relative to the mechanical junction 500.

The mechanical junction 500 includes a keyed slot 520 that may complement a key on a pole. The keyed slot 520 may advantageously aid in properly aligning the pole in the front bottom end 505A. The keyed slot 520 may, for example, be used to clock the position of the sleeve adapter (e.g., the internal sleeve mentioned in the previous paragraph). In some embodiments, the keyed slot may be used for various other accessories (e.g., a MUHL-to-CAPRA conversion leg adapter).

In some examples, an exemplary mechanical junction may not have a locking mechanism. For example, the mechanical junction may be the mechanical junction shown in page 38 of the drawings of U.S. Provisional Application Ser. No. 62/620,305. A mechanical junction without a locking mechanism may be used as the mechanical junction 330 shown in FIGS. 3A-B.

The angles between the different ends of the mechanical junction 500 may be defined as follows: $\theta_1$=an angle between the back bottom end 505B and the front top end 505D may be about 135, 140, 145, 150, 155, 160, 165, 170, 175, or about 180 degrees or more; $\theta_2$=an angle between the front bottom end 505A and the back top end 505C may be about 135, 145, 155, 165, 175, 177, 179, 180, 181, 183, or about 185 degrees or more; $\theta_3$=an angle between the back top end 505C and the side end 505E may be about 70, 80, 85, 87, 89, 90, 91, 93, 95, 100, or about 110 degrees or more.

Figure 6A:
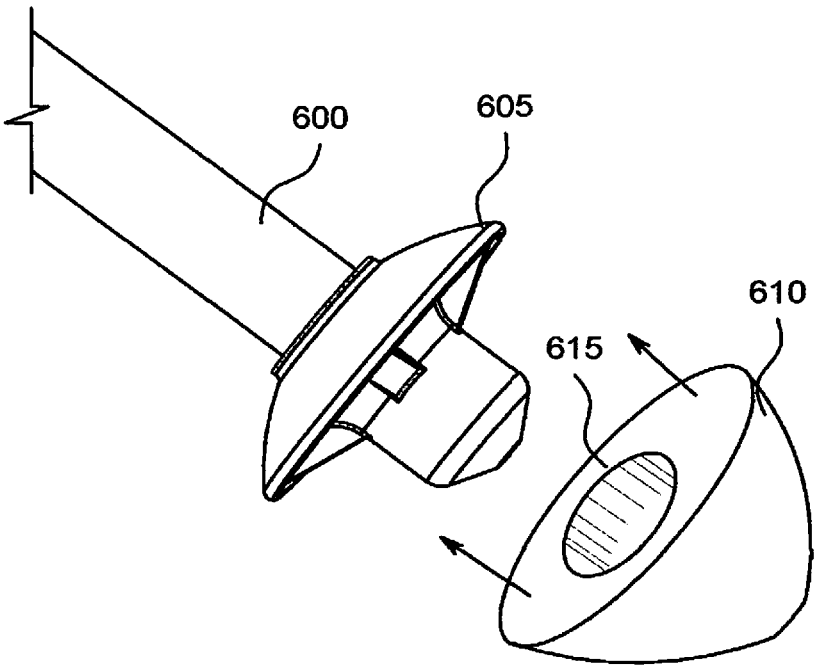
FIGS. 6A and 6B depict perspective views of an exemplary foot accessory for a chair leg.
Figure 6B:
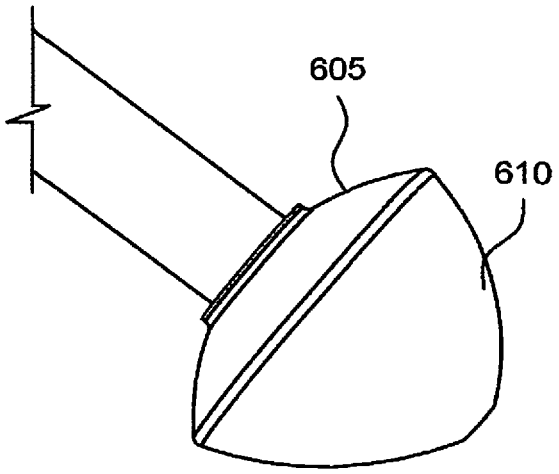

FIGS. 6A and 6B depict perspective views of an exemplary foot accessory for a chair leg. A chair leg 600 includes a foot 605. The chair leg 600 may, in some examples, be the chair leg 110 in FIG. 1, the pole 115 in FIG. 1, the leg 310 in FIG. 3A-B, or the leg 315 in FIG. 3A-B. The foot 605 may couple to a foot accessory 610. For example, the foot accessory 610 may include a hole 615 having an inner surface configured to frictionally engage the foot 605, such that the foot accessory 610 is coupled with a distal end of the foot 605. In some examples, the foot accessory 610 may be a releasable padded foot. The foot 605 and foot accessory 610 may form a two-piece foot, where the foot accessory 610 can slip over foot 605. The foot accessory 610 may be removed from the foot 605 to reduce weight for backpacking. The foot accessory 610 may be added the foot 605 when deploying the collapsible chair on a smooth floor (e.g., hardwood floor). In various examples, the foot accessory 610 may be formed of a (hard) rubber material.

Figure 7:
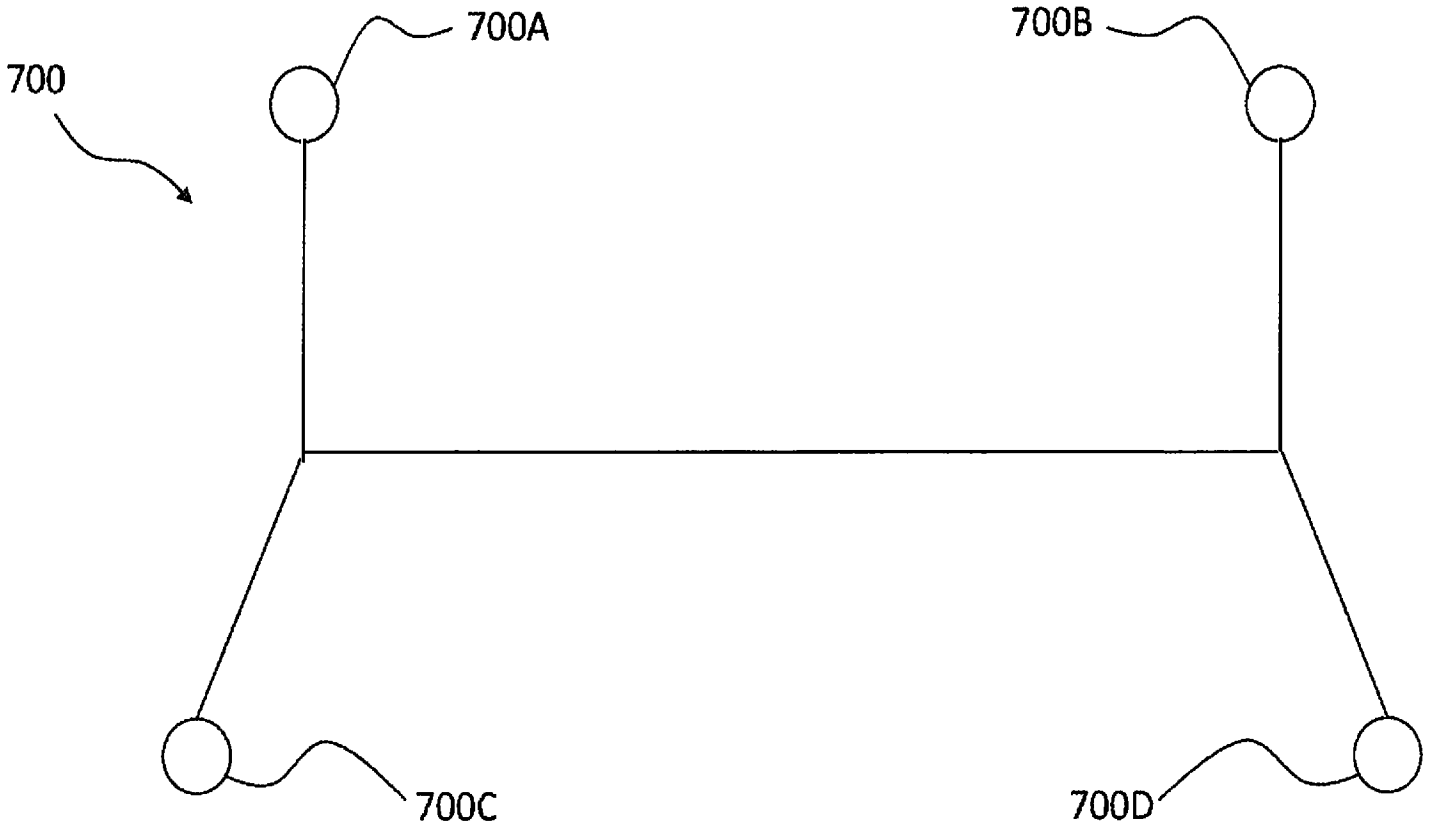
FIG. 7 depicts a plan view of an exemplary trapezoidal footprint of an exemplary collapsible chair.

FIG. 7 depicts a plan view of an exemplary trapezoidal footprint of an exemplary collapsible chair. A trapezoidal footprint 700 may be created when a deployed collapsible chair (e.g., collapsible chairs 105, 300, 400) is placed on a flat surface. For example, the pair of poles 115 or pair of front legs 315 may correspond to top two vertices 700A, 700B of the trapezoidal footprint 700, while the pair of back legs 110, 310 may correspond to bottom two vertices 700C, 700D of the trapezoidal footprint 700. The trapezoidal footprint 700 may advantageously provide highly stable support points for a collapsible chair that may allow the chair to be substantially tip-resistant.

Figure 8A:
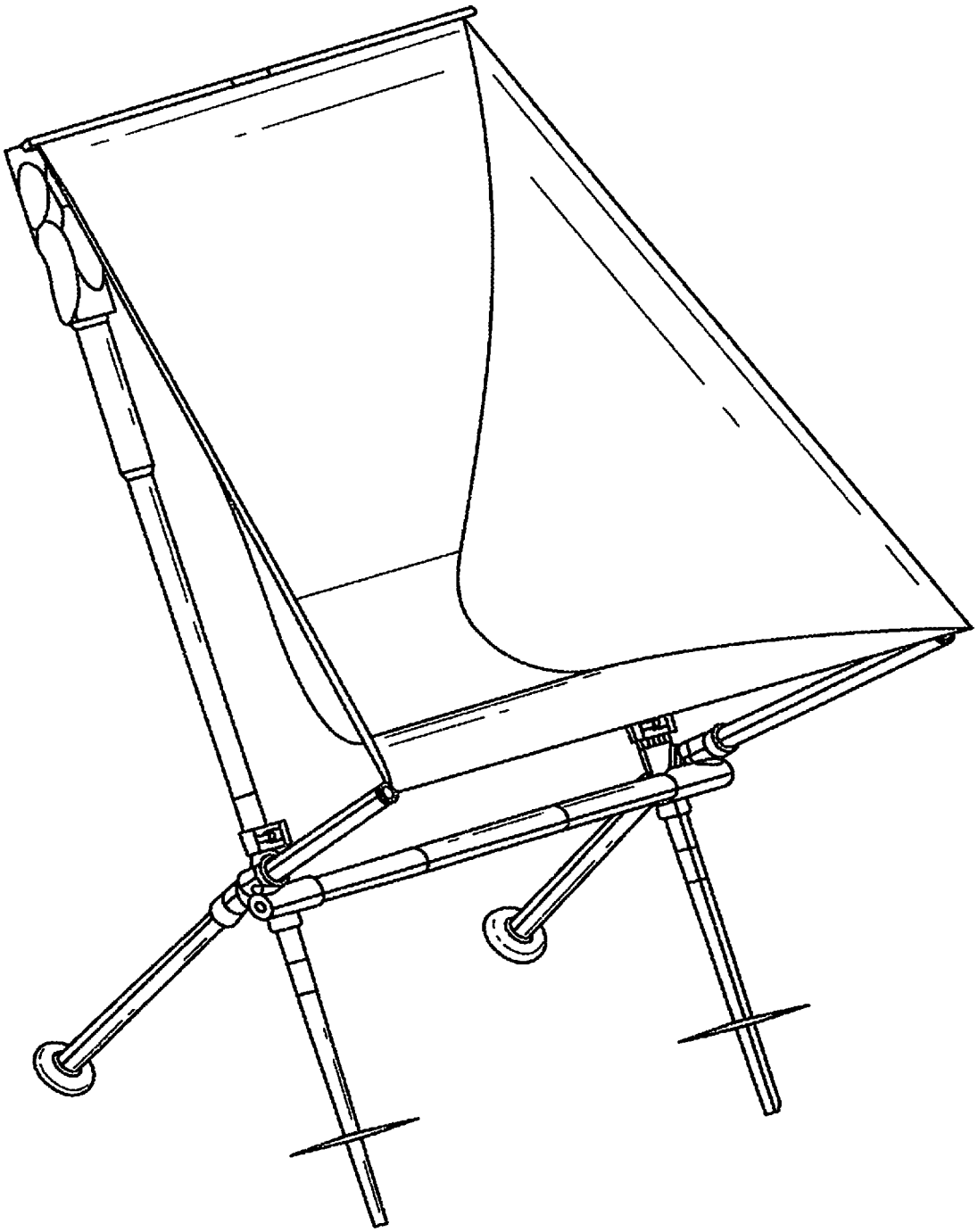
FIGS. 8A, 8B, 8C, 8D, 8E, 8F, and 8G depict various views of an exemplary collapsible chair.
Figure 8B:
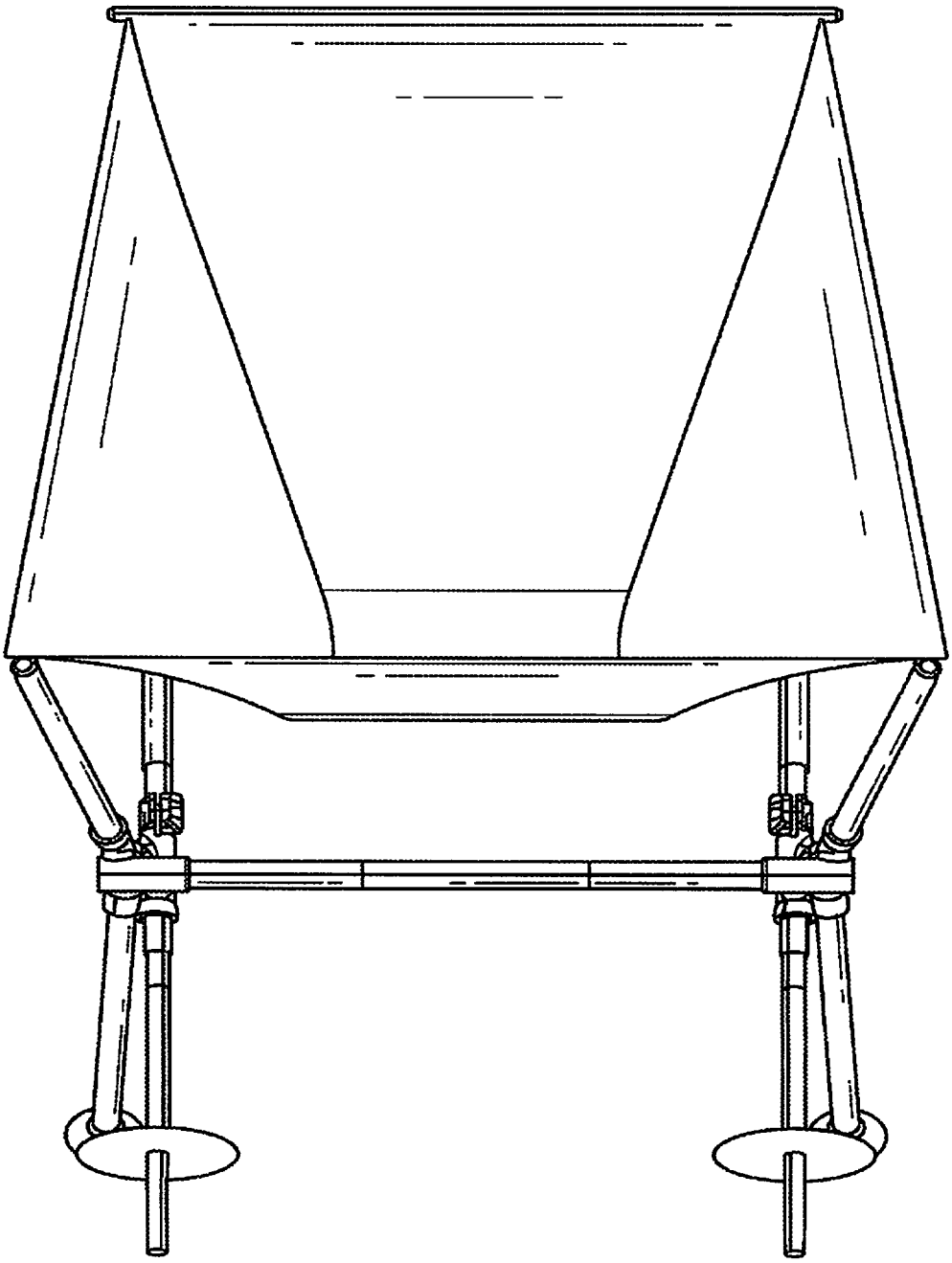
Figure 8C:
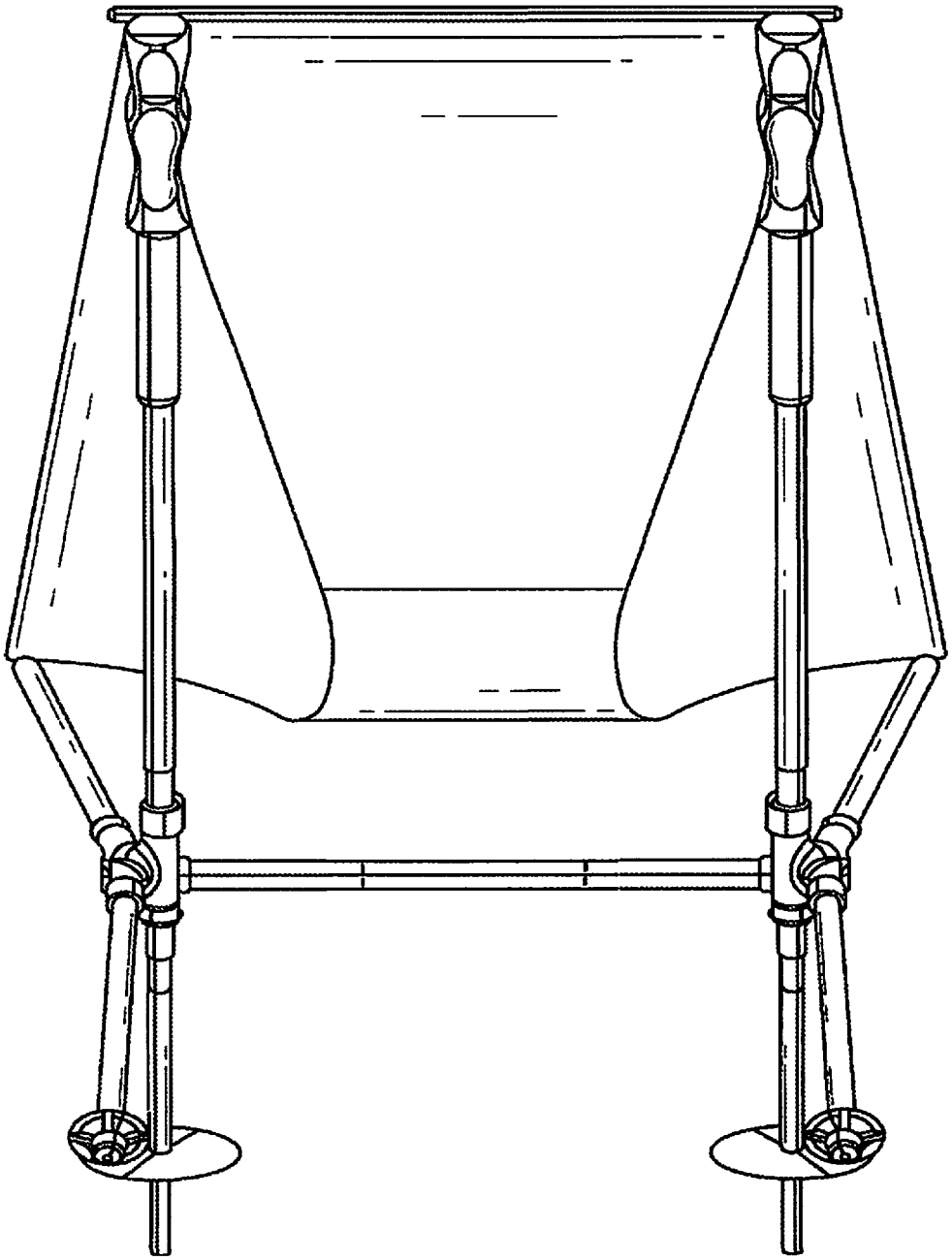
Figure 8D:
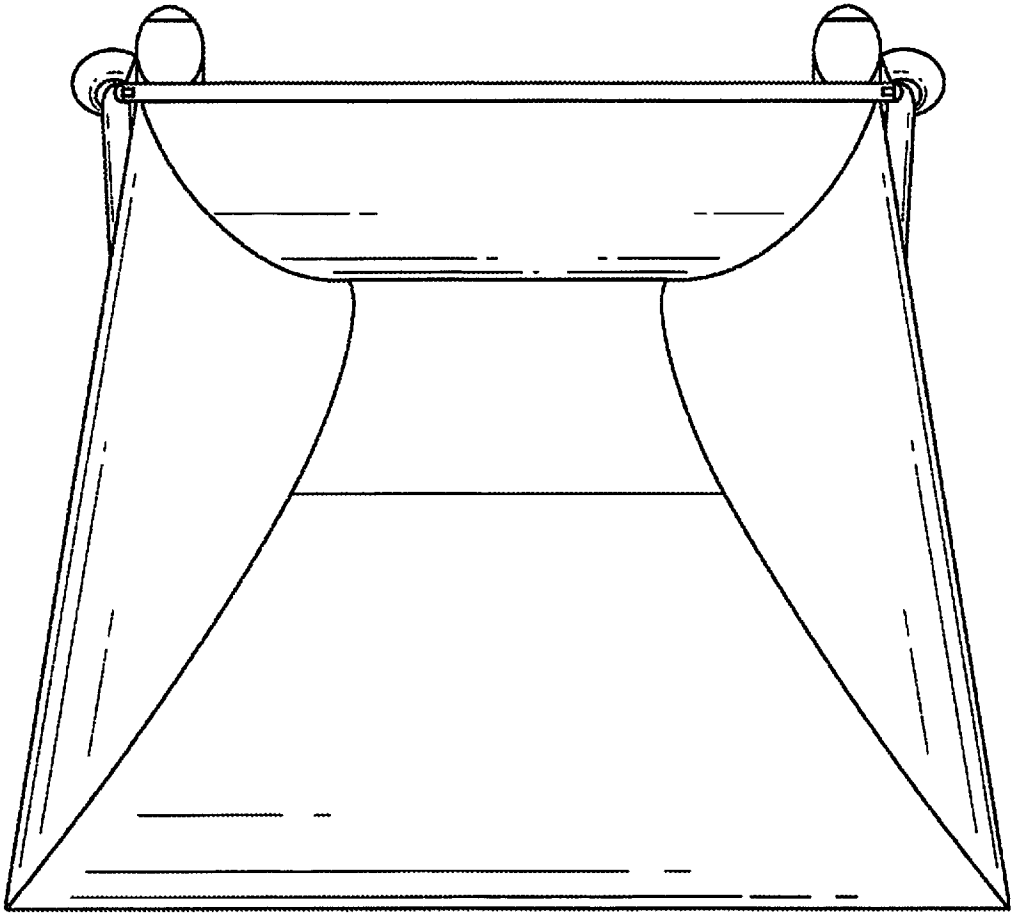
Figure 8E:
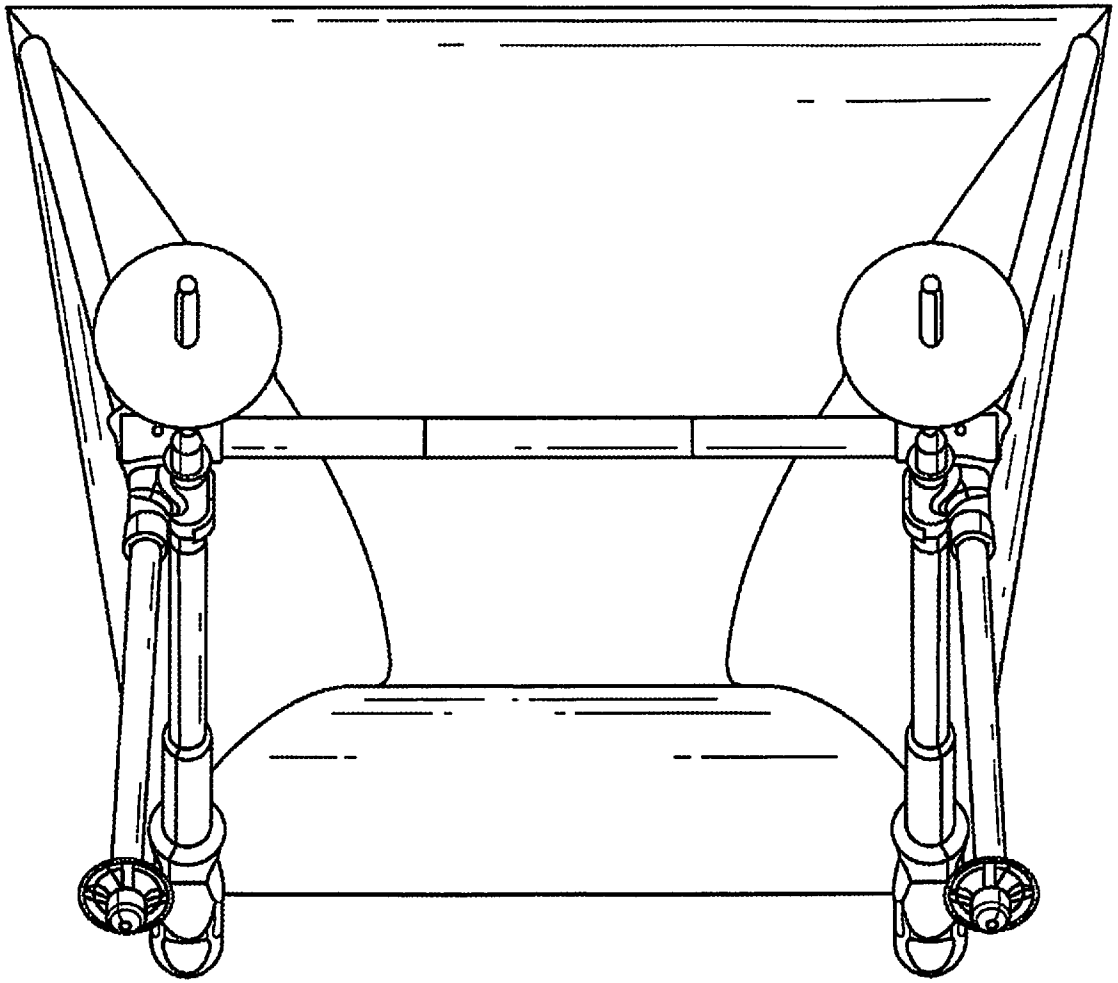
Figure 8F:
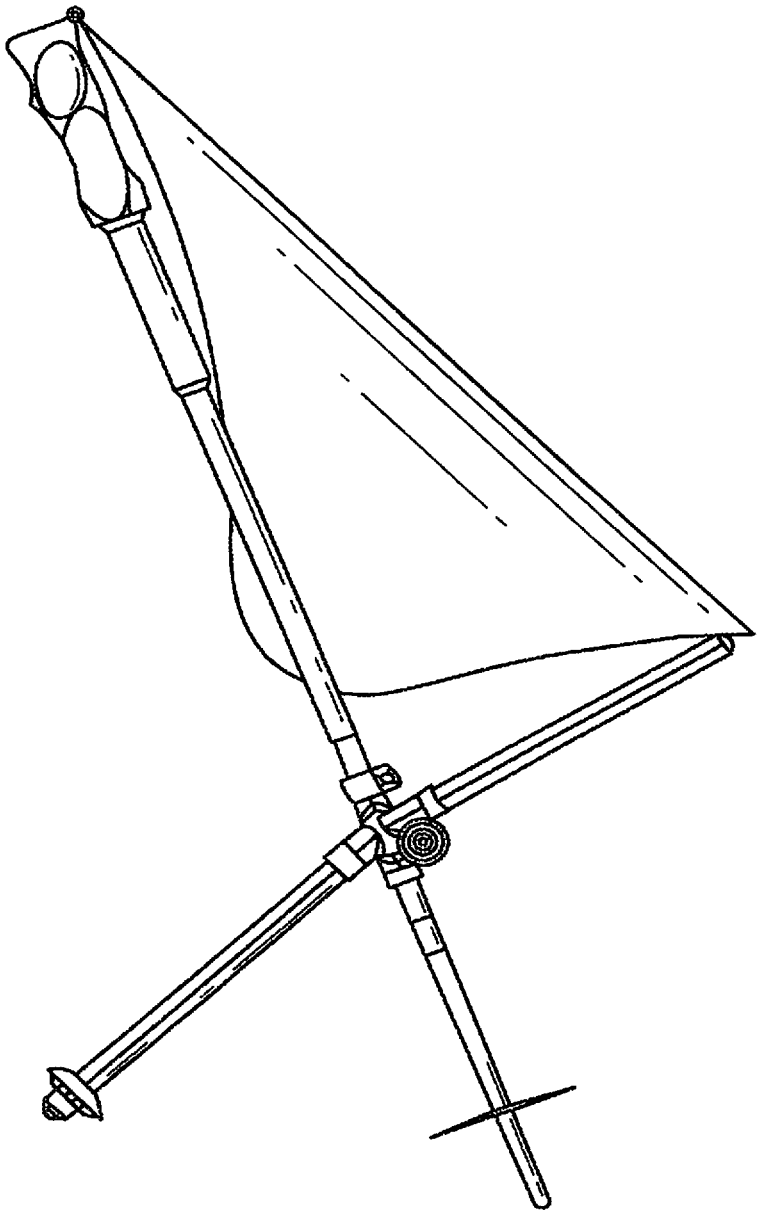
Figure 8G:
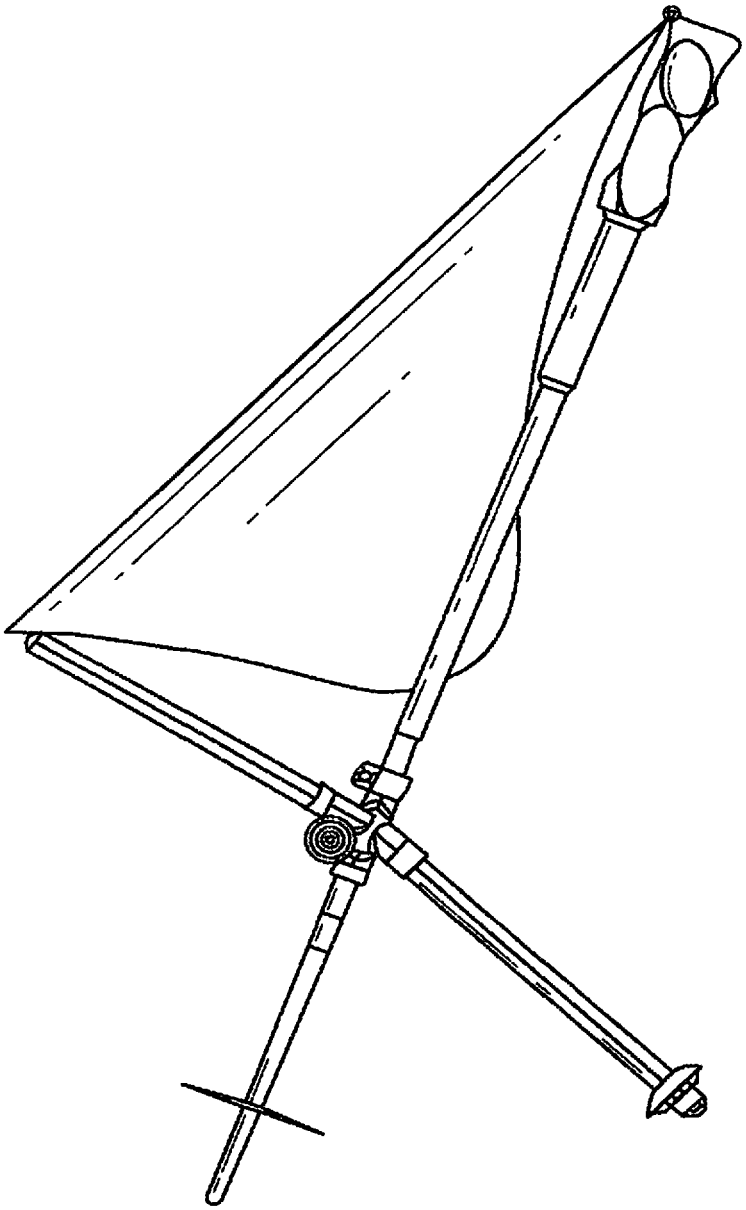

FIGS. 8A, 8B, 8C, 8D, 8E, 8F, and 8G depict various views of an exemplary collapsible chair. FIG. 8A is a front perspective view of an exemplary collapsible chair. FIG. 8B is a front elevational view of an exemplary collapsible chair. FIG. 8C is a back elevational view of an exemplary collapsible chair. FIG. 8D is a top elevational view of an exemplary collapsible chair. FIG. 8E is a bottom elevational view of an exemplary collapsible chair. FIG. 8F is a right-side elevational view of an exemplary collapsible chair. FIG. 8G is a left-side elevational view of an exemplary collapsible chair.

Figure 9:
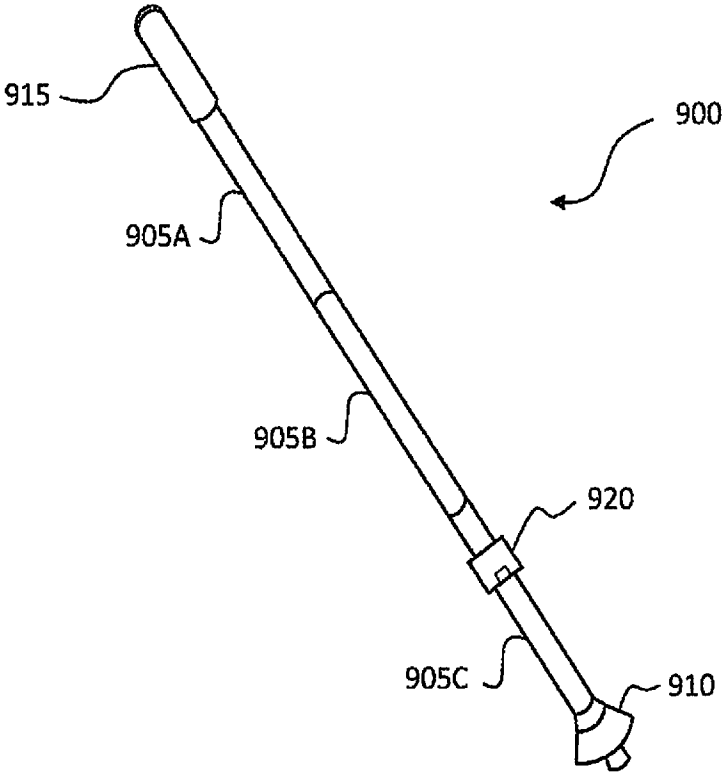
FIG. 9 depicts a perspective view of an exemplary conversion leg.

FIG. 9 depicts a perspective view of an exemplary conversion leg. A conversion leg 900 may be used as a substitute for a pole 115 in a collapsible chair 100. The conversion leg 900 includes three segments 905A, 905B, and 905C. In some examples, each segment 905A, 905B, and 905C may be an aluminum tube. Each segment 905A, 905B, and 905C is shock-cord-coupled with an adjacent segment. As such, two of the conversion legs 900 may be advantageously used with the collapsible chair 100 and then collapsed and stored in the stowage bag 140. The conversion leg 900 includes a stop collar 920 with a keyed detail. The keyed detail of the stop collar 920 may mate with the keyed slow 520 of the mechanical junction 500, which may, for example, hold the conversion leg 900 in a fixed position relative to the mechanical junction 500 (when coupled). The conversion leg 900 includes a removable cork or handle 915. The removable cork/handle 915 may be a hard foam handle. The removable cork/handle 915 may include at a distal end an injection molded tip that interfaces with the lateral stiffener rod 345A, 345B in the fabric seat back 335.

Although various embodiments have been described with reference to the Figures, other embodiments are possible. For example, the mechanical junction may be formed of a hard and strong material (e.g., steel, aluminum, titanium, injection molded nylons, or composite materials). Various rods may be formed of a lightweight and hard material (e.g., aluminum, titanium, or composite materials). The flexible chair seat may be formed of a cloth or synthetic material (e.g., cotton, nylon, or polyester). In some examples, the flexible chair seat may be formed of a lightweight and strong material (e.g., ripstop nylon fabric, cuben fibers, or polyethylene).

In some examples, the collapsible chair may weight a little as 1 pound (e.g., MUHL chair 100) or 2 pounds (e.g., CAPRA chair 300), which may advantageously allow for high/lightweight portability for a hiking or trekking user. In some examples, the mechanical junctions may function as universal adapters that may couple to a wide variety of (trekking or skiing) poles. In some embodiments, various components may be shock-cord-coupled to one another, which may advantageously prevent some components from being separated (and lost) from other components.

In some examples, various components of collapsible chair may be sold as a kit. For example, the kit may contain the flexible chair seat, the mechanical junctions, the collapsible lateral rod, the back legs, and the front chair support rods, all stored within the stowage bag. The poles may be sold separately. In some examples, the kit may contain the flexible chair seat, the mechanical junctions, the collapsible lateral rod, the back legs, the front legs, the front chair support rods, and the back chair support rods, all stored within the stowage bag. In some examples, a front chair support rod and back chair support rod may be formed of a unitary construction (e.g., a single support rod configured to extend through the mechanical junction).

In various examples, when it is said that a first part (e.g., the back leg 110) is "shock-cord-coupled" to a second part (e.g., mechanical junction 130), it may mean that the first part is coupled to the second part via a shock cord connection. In some embodiments, the collapsible lateral rod may be a telescoping rod that allows for the collapsible lateral rod to collapse to a fraction of its maximum length. In various examples, the collapsible lateral rod may releasingly lock (e.g., via a twist lock) to the mechanical junctions.

In some embodiments, a first mechanical junction (130) may couple a first end of the collapsible lateral rod (120), a first leg (110), and a first chair support member (125) in fixed positions relative to one another. The first mechanical junction may be adapted to releasably couple with a first pole (115). In some examples, a second mechanical junction (130) may couple a second end of the collapsible lateral rod (120), a second leg (110), and a second chair support member (125) in fixed positions relative to one another. The second mechanical junction may be adapted to releasably couple with a second pole (115).

In some examples, the Capra-chair 300 may have features depicted with the Muhl-chair 100 (e.g., locking mechanisms 150). In various examples, the Muhl-chair 100 may have features depicted with the Capra-chair 300 (e.g., top pocket 350, lateral stiffener rod 345A/345B, underquilt 365, back strap 370, under stowage bag 372).

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A collapsible chair (100) comprising:

a collapsible lateral rod (120) comprising a first end and a second end;

a first mechanical junction (130) adapted to couple with the first end of the collapsible lateral rod (120), and adapted to releasably couple with a first base support structure component (115) that extends collinearly through the first mechanical junction;

a second mechanical junction (130) adapted to couple with the second end of the collapsible lateral rod (120), and adapted to releasably couple with a second base support structure component (115) that extends collinearly through the second mechanical junction;

first and second legs (110, 110) releasably coupled to the first and second mechanical junctions (130, 130), respectively;

[a] first and second front chair support members (125, 125) releasably coupled to the first and second mechanical junctions (130, 130), respectively; and, a flexible chair seat (135) comprising a front right section, a front left section, a top right section, and a top left section, wherein when the first and second base support structure components (115, 115) are respectively coupled with the first and second mechanical junctions (130, 130):

the first and second base support structure components (115, 115) function as third and fourth legs, respectively, of the collapsible chair (100), and, the front right section is adapted to releasably couple with the first front chair support member (125) and the front left section is adapted to releasably couple with the second front chair support member (125).

2. The collapsible chair (100) of claim 1[, further comprising a flexible chair seat (135)], wherein when the collapsible chair (100) is in a deployed state (100E), a user seated in the flexible chair seat (135) creates a load path that applies a coaxial load into the first and second base support structure components (115).

3. The collapsible chair (100) of claim 2, wherein the coaxial load extends collinearly throughout the first and second mechanical junctions (130, 130) and the first and second base support structure components (115, 115).

4. The collapsible chair (100) of claim 3, wherein the load path results in an alignment that reduces a 3-point bending of the first and second base support structure components (115, 115).

5. The collapsible chair (100) of claim 1, the first and second mechanical junctions (130, 130) further comprise respective first and second apertures, such that when the first and second base support structure components (115, 115) are respectively coupled with the first and second mechanical junctions (130, 130), the first base support structure component (115) extends through the first mechanical junction (130) via the first aperture, and the second base support structure component (115) extends through the second mechanical junction (130) via the second aperture.

[6. The collapsible chair (100) of claim 1, wherein the collapsible lateral rod (120) further comprises a first rod section releasably coupled to a second rod section.]

7. The collapsible chair (100) of claim 1, wherein the first and second ends of the collapsible lateral rod (120) are fixedly coupled to the first and second mechanical junctions (130, 130), respectively.

8. The collapsible chair (100) of claim 1, wherein the first leg (110) is shock-cord-coupled to the first mechanical junction (130), the first front chair support member (125) is shock-cord-coupled to the first mechanical junction (130), and the second front chair support member (125) is shock-cord-coupled to the second mechanical junction (130).

9. The collapsible chair (100) of claim 1, wherein when the collapsible chair (100) is in a deployed state (100A) suitable for seating a person:

the collapsible lateral rod (120) and the first base support structure component (115) define a first angle ($\theta_3$) between about 80 and about 100 degrees, and, the collapsible lateral rod (120) and the second base support structure component (115) define a second angle ($\theta_3$) between about 80 and about 100 degrees.

10. The collapsible chair (100) of claim 1, wherein when the collapsible chair (100) is in a deployed state (100A) suitable for seating a person, a footprint of the first, second, third, and fourth legs (110, 110, 115, 115) define a trapezoidal footprint (700).

11. A collapsible chair (100) comprising:

a *coaxially slidingly assembled* collapsible lateral rod (120) comprising a first end and a second end;

a first mechanical junction (130) adapted to couple with the first end of the collapsible lateral rod (120), and adapted to releasably couple with a first base support structure component (115);

a second mechanical junction (130) adapted to couple with the second end of the collapsible lateral rod (120), and adapted to releasably couple with a second base support structure component (115);

first and second legs (110, 110) releasably coupled to the first and second mechanical junctions (130, 130), respectively;

[a] first and second front chair support members (125, 125) releasably coupled to the first and second mechanical junctions (130, 130), respectively; and, a flexible seat (135) comprising a front right section and a front left section, wherein when the first and second base support structure components (115, 115) are respectively coupled with the first and second mechanical junctions (130, 130):

the first and second base support structure components (115, 115) function as third and fourth legs, respectively, of the collapsible chair (100), and, the front right section is adapted to releasably couple with the first front chair support member (125) and the front left section is adapted to releasably couple with the second front chair support member (125).

12. The collapsible chair (100) of claim 11[, further comprising a flexible seat (135)], wherein when the collapsible chair (100) is in a deployed state (100E), a user seated in the flexible seat (135) creates a load path that applies a coaxial load into the first and second base support structure components (115).

13. The collapsible chair (100) of claim 12, wherein the coaxial load extends collinearly throughout the first and second mechanical junctions (130, 130) and the first and second base support structure components (115, 115).

[14. The collapsible chair (100) of claim 11, wherein the load path results in an alignment that reduces a 3-point bending of the first and second base support structure components (115, 115).]

15. The collapsible chair (100) of claim 11, wherein when collapsible chair (100) is in a deployed state (100A) suitable for seating a person:

the first leg (110) and the first front chair support member (125) define a first angle ($\theta_1$) between about 135 and about 180 degrees, and, the second leg (110) and the second front chair support member (125) define a second angle ($\theta_1$) between about 135 and about 180 degrees.

16. The collapsible chair (100) of claim 11, wherein when the collapsible chair (100) is in a deployed state (100A) suitable for seating a person:

the collapsible lateral rod (120) and the first base support structure component (115) define a first angle ($\theta_3$) between about 80 and about 100 degrees, and, the collapsible lateral rod (120) and the second base support structure component (115) define a second angle ($\theta_3$) between about 80 and about 100 degrees.

17. A collapsible chair (100) comprising:

a collapsible lateral rod (120) comprising a first end and a second end;

first and second legs (110, 110);

a first and second front chair support members (125, 125);

a flexible chair seat (135) comprising a front right section, a front left section, a top right section, and a top left section; and, a first means for coupling the first end of the collapsible lateral rod (120), the first leg (110), and the first chair support member (125) in fixed positions relative to one another, the first means for coupling adapted to releasably couple with a third leg (115) of the collapsible chair and include a load path that resists an axial compression of the third leg;

a second means for coupling the second end of the collapsible lateral rod (120), the second leg (110), and the second chair support member (125) in fixed positions relative to one another, the second means for coupling adapted to releasably couple with a fourth leg (115) of the collapsible chair and include a load path that resists an axial compression of the fourth leg;

wherein the third and fourth legs (115, 115) are respectively coupled with the first and second means for coupling and extend collinearly therethrough, the front right section is adapted to releasably couple with the first front chair support member (125) and the front left section is adapted to releasably couple with the second front chair support member (125).

18. The collapsible chair (100) of claim 17, wherein the first leg (110) is shock-cord-coupled to the first means for coupling, the second leg (110) is shock-cord-coupled to the second means for coupling, the first front chair support member (125) is shock-cord-coupled to the first means for coupling, and the second front chair support member (125) is shock-cord-coupled to the second means for coupling.

19. The collapsible chair (100) of claim 17, wherein when the collapsible chair (100) is in a deployed state (100A) suitable for seating a person:

the first leg (110) and the first front chair support member (125) define a first angle ($\theta_1$) between about 135 and about 180 degrees, and, the second leg (110) and the second front chair support member (125) define a second angle ($\theta_1$) between about 135 and about 180 degrees.

20. The collapsible chair (100) of claim 17, wherein when the collapsible chair (100) is in a deployed state (100A) suitable for seating a person:

the collapsible lateral rod (120) and the third leg (115) define a first angle ($\theta_3$) between about 80 and about 100 degrees, and, the collapsible lateral rod (120) and the fourth leg (115) define a second angle ($\theta_3$) between about 80 and about 100 degrees.

*21. A collapsible chair comprising:*

*a flexible seat comprising a front section and a back section; and,*

*at least one hub configured to mechanically and removably couple to a plurality of chair support members comprising at least a portion of a trekking pole, wherein the trekking pole comprises a handle, a tip, and a plurality of axially collapsible portions, the at least one hub configured such that:*

*when the plurality of chair support members are mechanically and removably coupled to the at least one hub, including to an end of the at least a portion of the trekking pole,*

*when a first at least one of the plurality of chair support members is releasably coupled to the front section, and*

*when a second at least one of the plurality of chair support members is releasably coupled to the back section,*

*then the flexible seat is supported, in a deployed state for seating a person, by the at least one hub and the plurality of chair support members.*

*22. The collapsible chair of claim 21, wherein at least the portion of the trekking pole comprises a handle of the trekking pole.*

*23. The collapsible chair of claim 21, wherein an entirety of the trekking pole is used to support the flexible seat.*

*24. The collapsible chair of claim 21, wherein the at least one hub comprises a first hub and a second hub and, in a deployed mode, the first hub is coupled to a first end of a lateral support member and the second hub is coupled to a second end of the lateral support member.*

*25. The collapsible chair of claim 21, wherein the at least one hub is further configured to couple to a plurality of legs in the deployed state.*

*26. A collapsible chair comprising:*

*a frame comprising a first chair support member and a second chair support member, each having a first end and a second end;*

*a lateral stiffener rod having a first end and a second end; and,*

*a flexible seat having a front portion and a back portion comprising a first pocket configured to receive the lateral stiffener rod, wherein the back portion is configured to releasably couple to the first end of the first chair support member and of the second chair support member,*

*wherein, in a deployed mode, the lateral stiffener rod is releasably and entirely disposed in the first pocket and extends laterally across a top of the flexible seat such*

*that the first end of the lateral stiffener rod is positioned above the first end of the first chair support member and the second end of the lateral stiffener rod is positioned above the first end of the second chair support member.*

*27. The collapsible chair of claim 26, further comprising:*

*a first mechanical joint coupled to the first chair support member; and,*

*a second mechanical joint coupled to the second chair support member.*

*28. The collapsible chair of claim 26, wherein at least one of the first chair support member and the second chair support member comprises at least a first segment of a trekking pole.*

*29. The collapsible chair of claim 26, wherein the first pocket comprises:*

*an aperture configured such that the lateral stiffener rod may be selectively disposed in the first pocket; and,*

*a first seam defining a capture pocket at an end of the first pocket such that, when the lateral stiffener rod is disposed in the first pocket through the aperture and the first end of the lateral stiffener rod is operated into the capture pocket, then the lateral stiffener rod is retained in the first pocket at least by the first seam.*

*30. A portable chair comprising:*

*a frame comprising a plurality of chair support members; and,*

*a flexible seat comprising:*

*a front portion and a back portion;*

*a first side cutout area and a second side cutout area at least partially defining:*

*a seat portion extending from the front portion to the back portion;*

*a first side panel extending from the front portion to the back portion and to a first upper side of the seat portion; and,*

*a second side panel extending from the front portion to the back portion and to a second upper side of the seat portion opposite the first upper side; and,*

*a lower portion of the seat portion, the lower portion being free of attachment to the first side panel and the second side panel such that each cutout area comprises an aperture bounded by the corresponding side panel and the lower portion,*

*wherein, in a deployed mode, the plurality of chair support members are coupled to the front portion and the back portion of the flexible seat such that the seat portion, the first side panel, and the second side panel cooperate to support a person sitting in the seat portion such that, in response to a force applied by the person sitting in the seat portion:*

*the lower portion of the seat portion conforms to a hip region of the person separately from the first side panel and the second side panel, and*

*the first side panel and the second side panel cooperate with the seat portion to support a lumbar region of the person.*

*31. The portable chair of claim 30, the frame comprising a collapsible frame.*

*32. The collapsible chair of claim 21, wherein, when the flexible seat is supported in the deployed state, the flexible seat is removably coupled to the plurality of chair support members.*

*33. The collapsible chair of claim 32, wherein, in the deployed state, the at least a portion of the trekking pole extends from the at least one hub to the flexible seat.*

*34. The collapsible chair of claim 21, wherein, in the deployed state, the plurality of chair support members are removably coupled to the at least one hub.*

*35. The collapsible chair of claim 21, wherein the axially collapsible portions of the trekking pole are separable.*

* * * * *